United States Patent
Earles et al.

(10) Patent No.: US 10,997,806 B2
(45) Date of Patent: *May 4, 2021

(54) WIRELESS CREDENTIAL PROXIMITY CONTROL

(71) Applicant: Schlage Lock Company LLC, Carmel, IN (US)

(72) Inventors: Jeremy Earles, Evansville, IN (US); Joseph W. Baumgarte, Carmel, IN (US); Todd Eberwine, Golden, CO (US); Brian Sherman, Omaha, NE (US); Ryan C. Kincaid, Indianapolis, IN (US); Jeffrey S. Neafsey, Arvada, CO (US); Michael P. Hogan, Carmel, IN (US); Timothy N. Comerford, Indianapolis, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/559,153

(22) Filed: Sep. 3, 2019

(65) Prior Publication Data
US 2020/0134949 A1   Apr. 30, 2020

Related U.S. Application Data

(63) Continuation of application No. 16/057,232, filed on Aug. 7, 2018, now Pat. No. 10,403,072, which is a
(Continued)

(51) Int. Cl.
*G07C 9/00* (2020.01)
*G06F 21/35* (2013.01)
*G07C 9/20* (2020.01)

(52) U.S. Cl.
CPC ......... *G07C 9/00309* (2013.01); *G06F 21/35* (2013.01); *G07C 9/00563* (2013.01);
(Continued)

(58) Field of Classification Search
CPC ...... G07C 9/37; G07C 9/257; G07C 9/00563; G07C 9/25; G07C 9/00571; G07C 9/27;
(Continued)

(56) References Cited

U.S. PATENT DOCUMENTS 6,577,226 B1 * 6/2003 Steiner .................... E05B 81/78
340/10.34
6,803,851 B1 * 10/2004 Kramer .................... B60R 25/24
340/12.51

(Continued)

FOREIGN PATENT DOCUMENTS

WO   2015191190 A1   12/2015

OTHER PUBLICATIONS

Canadian Office Action; Canadian Intellectual Property Office; Canadian Patent Application No. 3,021,205; dated Jul. 12, 2019; 4 pages.
(Continued)

*Primary Examiner* — Nam V Nguyen
(74) *Attorney, Agent, or Firm* — Taft Stettinius & Hollister LLP

(57) ABSTRACT

Embodiments of the present application generally relate to controlling ingress/egress through entryway devices. More particularly, but not exclusively, embodiments of the present invention relate to attaining confirmation of intent relating to access to a controlled opening. According to certain embodiments, the credential device and/or the user of the credential device is prompted to provide a response, or otherwise is to perform certain actions, that can demonstrate a confirmation of intent to gain access to the controlled opening. Such
(Continued)

responses and/or actions can be evaluated to determine authority to gain access to the controlled opening. Further, such intent confirmation events may, depending on the embodiment, be performed before or after credential information is communicated from the credential device and/or before or after pairing of the access control device and the credential device. According to other embodiments, intent may be confirmed, at least in part, based on changes in the characteristics of signals communicated from the credential device.

15 Claims, 8 Drawing Sheets

Related U.S. Application Data continuation of application No. 15/488,987, filed on Apr. 17, 2017, now Pat. No. 10,043,330.

(60) Provisional application No. 62/323,127, filed on Apr. 15, 2016.

(52) U.S. Cl.
CPC ........ *G07C 9/20* (2020.01); *G06F 2221/2103* (2013.01); *G06F 2221/2111* (2013.01); *G07C 9/0069* (2013.01); *G07C 2009/00325* (2013.01); *G07C 2209/62* (2013.01); *G07C 2209/63* (2013.01)

(58) Field of Classification Search
CPC ... G07C 9/28; G07C 9/32; G07C 9/26; G07C 9/33; G07C 9/00309; G07C 9/20; G07C 9/0069; G07C 2209/62; G07C 2209/63; G07C 2009/00325; G06F 21/35; G06F 2221/2103; G06F 2221/2111
USPC .............................. 340/5.52, 5.28, 5.61, 5.82
See application file for complete search history.

(56) References Cited

U.S. PATENT DOCUMENTS

| | | | | |
|---|---|---|---|---|
| 7,283,034 | B2 * | 10/2007 | Nakamura | B60R 25/246 340/5.72 |
| 8,427,278 | B2 * | 4/2013 | Petricoin, Jr. | G07C 9/28 340/5.7 |
| 8,451,087 | B2 * | 5/2013 | Krishnan | B60J 5/04 340/5.72 |
| 8,947,202 | B2 * | 2/2015 | Tucker | H04W 76/14 340/5.61 |
| 9,007,173 | B2 | 4/2015 | McIntyre et al. | |
| 9,057,210 | B2 * | 6/2015 | Dumas | G07C 9/27 |
| 9,196,104 | B2 * | 11/2015 | Dumas | G07C 9/20 |
| 9,443,365 | B2 | 9/2016 | Ahearn et al. | |
| 9,508,206 | B2 | 11/2016 | Ahearn et al. | |
| 9,580,046 | B2 * | 2/2017 | Luu | B60R 25/2054 |
| 9,646,165 | B1 * | 5/2017 | Saylor | E05B 49/00 |
| 9,646,436 | B1 * | 5/2017 | Campbell | G07C 9/00309 |
| 9,691,198 | B2 | 6/2017 | Cheng et al. | |
| 9,767,632 | B2 | 9/2017 | Johnson | |
| 9,852,559 | B2 | 12/2017 | Rettig et al. | |
| 10,403,072 | B2 * | 9/2019 | Earles | G07C 9/20 |
| 2003/0216817 | A1 * | 11/2003 | Pudney | E05B 81/78 700/17 |
| 2010/0075656 | A1 * | 3/2010 | Howarter | B60R 25/2009 455/420 |
| 2011/0285528 | A1 | 11/2011 | Weinstein et al. | |
| 2012/0280783 | A1 * | 11/2012 | Gerhardt | G07C 9/00309 340/5.6 |
| 2013/0027180 | A1 * | 1/2013 | Lakamraju | G07C 9/257 340/5.53 |
| 2014/0292481 | A1 | 10/2014 | Dumas et al. | |
| 2015/0199863 | A1 * | 7/2015 | Scoggins | G06F 21/335 340/5.25 |
| 2015/0294517 | A1 | 10/2015 | Herrala | |
| 2016/0036788 | A1 | 2/2016 | Conrad et al. | |
| 2016/0049026 | A1 | 2/2016 | Johnson | |
| 2016/0086406 | A1 | 3/2016 | Baumgarte | |
| 2016/0379428 | A1 | 12/2016 | Ahearn et al. | |
| 2017/0103647 | A1 * | 4/2017 | Davis | H04L 63/10 |
| 2017/0148244 | A1 | 5/2017 | Ahearn et al. | |
| 2017/0337758 | A1 | 11/2017 | Ahearn et al. | |
| 2019/0311303 | A1 * | 10/2019 | Kanteti | G06Q 10/02 |

OTHER PUBLICATIONS

International Search Report; International Searching Authority; International Patent Application No. PCT/US2017/027911; dated Jun. 27, 2017; 3 pages.

International Written Opinion; International Searching Authority; International Patent Application No. PCT/US2017/027911; dated Jun. 27, 2017; 7 pages.

Supplementary European Search Report; European Patent Office; European Patent Application No. 17783356.3; dated Nov. 8, 2019; 8 pages.

Canadian Office Action (Second); Canadian Intellectual Property Office; Canadian Patent Application No. 3,021,205; dated Aug. 4, 2020; 3 pages.

* cited by examiner

WIRELESS CREDENTIAL PROXIMITY CONTROL

CROSS REFERENCE TO RELATED APPLICATIONS

The present application is a continuation of U.S. application Ser. No. 16/057,232 filed Aug. 7, 2018 and issued as U.S. Pat. No. 10,403,072, which is a continuation of U.S. application Ser. No. 15/488,987 filed Apr. 17, 2017 and issued as U.S. Pat. No. 10,043,330, which claims the benefit of U.S. Provisional Patent Application Ser. No. 62/323,127 filed Apr. 15, 2016, the contents of each application incorporated herein by reference in their entirety.

BACKGROUND

Embodiments of the present invention generally relate to controlling ingress/egress through entryway devices. More particularly, but not exclusively, embodiments of the present invention relate to attaining confirmation of intent relating to access to a controlled opening(s) as part of an approach to controlling the opening/closing of entryway devices.

Security management systems often utilize a variety of access control devices to control ingress and/or egress through a controlled opening, including, for example, an entryway that can be closed through the use of an entryway device, including, but not limited to, a door or gate. The operation and management of such security management systems typically involves the transmission and/or receipt of certain electronic communications between different credential devices and an access control system. Often, the communications between the credential device and the access control system are generally omni-directional. For example, a mobile credential device may transmit signals containing information relating to authorization to unlock an lock device from a variety of positions relative to a receiving component of the access control system. Further such communication from the credential device may be automatically transmitted in that such communications often do not require specific prompting by a user of the credential device.

Yet, in at least certain situations, the credential device being able to automatically communicate information relating to authorization to pass through the controlled opening does not necessarily correlate to an intent by a user of the credential device to actually pass through a controlled opening. For example, the credential device may pass through a hallway having a plurality of controlled openings and associated lock devices. In certain situations, the presence of the credential device in relative close proximity to the lock device can lead to the credential device automatically communicating to the lock device information corresponding to authorization to unlock lock device and/or to pass through the associated controlled opening. Yet, the presence of the credential device in such a location does necessarily always equate to an intent of a user of the credential device to actually pass through any or all of those controlled openings. Moreover, in at least certain situations, despite the presence or position of the credential device, the actual intent of the user may be that the status(es) of at least one of the access control devices remain unchanged, such as, for example, the access control device(s) remains in a locked state and/or the associated entryway device(s) for the controlled entryway(s) remain closed.

Additionally, the omni-directional nature of at least some credential devices can present issues with determining which side(s) of the controlled opening the credential device is, or is no longer, positioned. For example, the omni-directional nature of communications at least with the credential device may present issues with determining whether the authorized credential device has, or has not, passed through, or is in the process of passing through, the associated controlled opening. For example, often, for at least some systems, following authorization for the lock device to be unlocked, and subsequent opening of the associated entryway device and corresponding passage through the controlled opening, the credential device may continue to communicate to the lock device an intent to pass through the controlled opening and/or a request that the lock device be in an unlocked state. Such continued communication can, in at least certain situations, lead to the lock device continuing to be in an unlocked state and/or leave the controlled opening otherwise susceptible to subsequent passage by unauthorized users, including people who may tailgate or otherwise subsequently follow the authorized credential device through the controlled opening.

BRIEF SUMMARY

In one aspect of the present application, a method is provided for controlling ingress/egress through entryway devices. More particularly, but not exclusively, embodiments of the present invention relate to attaining confirmation of intent relating to access to a controlled opening. According to certain embodiments, the credential device and/or the user of the credential device is prompted to provide a response, or otherwise is to perform certain actions, that can demonstrate a confirmation of intent to gain access to the controlled opening. Such responses and/or actions can be evaluated to determine authority to gain access to the controlled opening. Further, such intent confirmation events may, depending on the embodiment, be performed before or after credential information is communicated from the credential device and/or before or after pairing of the access control device and the credential device. According to other embodiments, intent may be confirmed, at least in part, on changes in the characteristics of signals communicated from the credential device.

BRIEF DESCRIPTION OF THE DRAWINGS

The description herein makes reference to the accompanying figures wherein like reference numerals refer to like parts throughout the several views.

Figure 1:
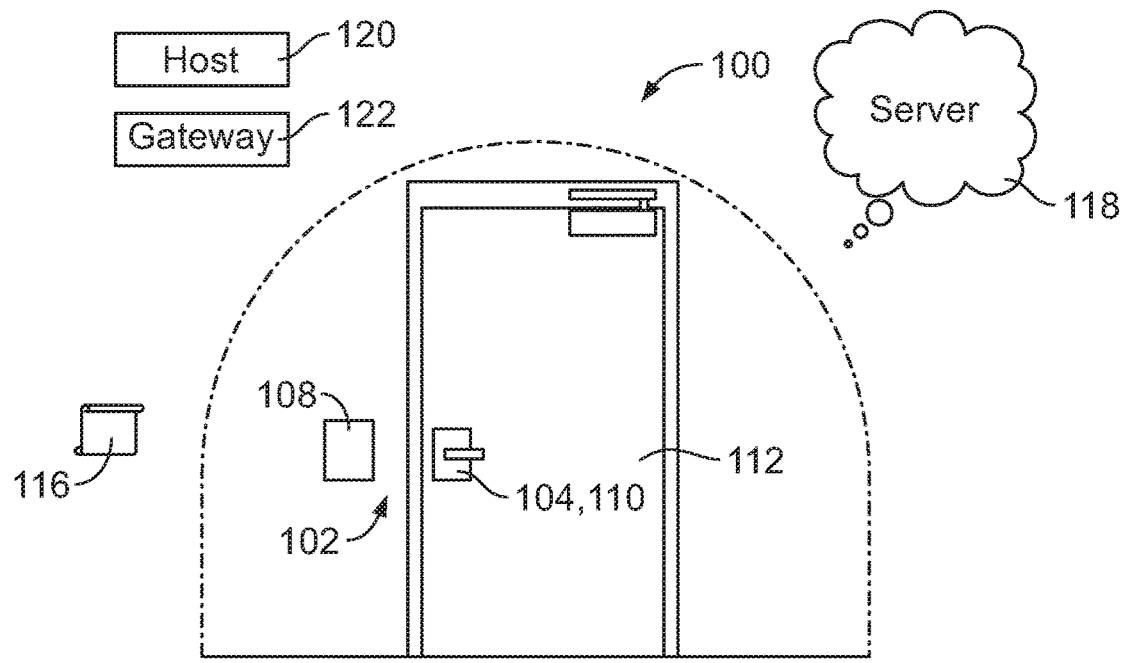
FIG. 1 illustrates a schematic view of an exemplary access control system.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

FIG. 1 illustrates a schematic view of an exemplary access control system 100. As illustrated, the access control system 100 includes at least one access control device 102, which in this example can include one or more lockset devices 104, door closers 106, and/or reader devices 108, and/or a combination thereof. However, the number and types of access control devices 102 may vary for different access control systems. For example, according to certain embodiments, the access control system 100 can also include, in addition to or in lieu of other access control devices 102, one or more exit devices and/or payment terminals, among other access control devices 102. According to embodiments discussed below, the access control device 102 can comprise an electronic lock 110 having a reader device 108, the reader device 108 being a part of, or electrically coupled to, the lockset device 104. However, according to other embodiments, the access control device 102 can comprise an electronic lock 110 or other device that is in electrical communication with the reader device 108 and/or receives information directly or indirectly from the reader device 108.

At least some types of access control devices 102 may be involved with controlling, managing, and/or facilitating the displacement, including authorization to displace, an entryway device 112 from a closed position to an open position, and/or from an open position to a closed position, and thereby at least assist in controlling ingress/egress through the associated controlled opening or entryway. For example, according to certain embodiments, at least one access control device 102 may be, or include, a lockset device 104, such as, but not limited to, an electronic lock 110, that includes a lock mechanism 114. According to certain embodiments, the lock mechanism can include, for, example, a displaceable bolt and/or a latch, such as, for example, a deadbolt or latch bolt, that is displaceable between locked and unlocked positions to selectively lockingly engage the adjacent door frame, wall, and/or mating components that are coupled or mounted to/in the adjacent entryway device. Similarly, according to other embodiments, the access control device(s) 102 can include an exit device having a push bar or push pad that is coupled to a lock mechanism 114 that includes a latch assembly. According to such an embodiment, the operable displacement of the push bar or pad can facilitate the displacement of a latch of the latch assembly from an extended, locked position to a retracted, unlocked position.

The door closer 116 can be configured to at least provide a force that assists in the displacement of the entryway device 112. For example, the door closer 116 may provide a force that at least assists in the displacement of the entryway device 112 from the open position to the closed position. Thus, certain door closers 106 may be structured to automatically return an opened, or partially opened, entryway device 112 to the closed position, and thereby remove the need for manual closing by a user. Conversely, according to certain embodiments, the door closer 116 may be set to resist the displacement of the entryway device 112 from at least one of the open and closed positions by a user. According to certain embodiments, the door closer 116 can be part of the access control device 102 such that operation of the access control device 102 can facilitate automatic opening or closing of the entryway device 112 via automatic operation of the door closer 116. For example, according to certain embodiments, the access control device 102 can be electrically coupled to a motor of the door closer 116, such that the access control device 102 can control the motor so as to facilitate the opening/closing of the entryway device 112.

The reader device 108 can for at least purposes of illustration and for at least certain embodiments, be part of the access control device 102, and may receive or detect credential and/or identification information in connection with a determination of whether a change in status of the lock mechanism 114, such as, for example, the lock mechanism being unlocked or locked, and/or displacement of the entryway device 112 to accommodate ingress/egress through the controlled opening generally is, or is not, authorized. According to certain embodiments, the reader device 108 is a credential reader that retrieves or detects credential information on or from a credential device 116. For example, certain reader devices 108 may include a credential reading interface structured to read at least one type of credential, including, but not limited to, a prox and/or NFC (i.e., smart card). The identification information provided to, or retrieved by, the reader device 108 may be evaluated by the reader device 108 or another device of the access control system 100 and/or access control device 102 in connection with determining whether the credential and/or identification from the credential device 116 has permission or authorization to operate components of the access control system 100 and/or access control device 102, such as, for example, to unlock the lock mechanism 114 of the associated access control device 102 and/or to displace the entryway device 112.

According to certain embodiments, the access control system 100 can include one or more servers 118 that can communicate with one or more of the access control devices 102 in a variety of different manners, including, for example, over a wide area network (WAN) (e.g., the Internet), a cellular data network, a local area network (LAN), or any combination thereof. According to certain embodiments, the server 118 may include, or comprise, a cloud-based server. However, a variety of other different types of servers may also be used for the server 118 and/or a web-based server, among other servers.

The server 118 and/or the access control device 102, including the reader device 108, can be configured to store a variety of different information, including, for example, user lists, access logs, and information related to each credential device 116, such as, for example, access permissions for each credential device 116 corresponding to each user in the user lists, a location, status, and/or type identifiers for each credential device 116, and/or any other information for the system 100. The server 118 and/or the access control device 102, including the reader device 108, can further include non-transitory computer executable instructions to perform various operations in the form of an application. The various operations can include, but are not limited to, functionality relating to program one or more of the access control devices 102, verifying access permissions received from the credential devices 116 at each reader device 108, determining a communication protocol or mode that is to be used to communicate information to devices of the access control system 100, issuing commands for establishing direct or indirect connections between various devices of the system 100, and updating user lists, access permissions, and adding/removing access control devices 102 and their associated reader devices 108 to/from the system 100, among other operations.

One or more types of devices can be employed as credential devices 116, including, but not limited to, mobile or portable electronic devices, including, but not limited to, personal electronic devices, smartphones, cellular phones, tablet computers, smart badges, smart bracelets, computing devices, passive or non-passive identification badges or tags, and electronic gaming devices, among other types of devices. Further, according to certain embodiments, the credential device 116 can have a credential or other identification information that can be used to establish whether the credential device 116 is authorized to communicate with the access control system 100, and/or to operate one or more access control devices 102, including authorization to gain access to/through one or more controlled openings, among other permissions or authorizations. Such credentials or identification can be provided and/or stored on the credential device 116 in a number of manners, including, for example, via use of memory and/or a software application, commonly referred to as an app, of the credential device 116, among other manners of storage of the credential information.

The credential device 116 can be in communication with one or more of the access control devices 102 and their associated reader devices 108 in a variety of different manners, including, for example, via a wireless communication protocol such as WI-FI and/or Bluetooth Low Energy (BLE). The access control device 102, including the associated reader device 108, can send to the credential device 116 a variety of different types of information, such as, for example, device identification information, diagnostic results, usage data, and the like, among other types of information. Additionally, according to certain embodiments, the credential device 116 may communicate with other devices of the system 100, including, for example, but not limited to, the server 118. For example, the credential device 116 may send a variety of different types of information to the server 118, such as, for example, identification information relating to the owner of the credential device 116, information identifying the access control device(s) 102 to which the credential device 116 is communicating, or attempting to communicate, with, firmware updates, information regarding activation or deactivation of components or access control devices 102, and/or information retrieved from the access control device 102, among other information.

According to certain embodiments, the access control system 100 may also include a host 120 that is used to control and/or manage the operations of the access control system 100. The host 120 may include any type of computing device, such as, for example, a laptop or desktop computer, or a mobile electronic device, among other computing devices, that includes a memory and a processor sufficient in size and operation to store and manipulate a database and one or more applications for communicating with the other devices of the access control system 100. For example, according to certain uses, a company, facility, or entity may utilize the host 120 to manage and oversee the operations of the access control system 100, including, for example, establishing authorization of certain credentials and/or users, establishing times for access control devices 102 to seek updates, setting parameters regarding time periods during which entryway devices 112 may be displaced from their respective closed position, and/or monitoring and analyzing information pertaining to the usage of components of the access control system 100. The host 120 may communicate with the access control system 100 in a variety of manners, including, but not limited to, through the use of a gateway 122. Additionally, the gateway 122 can communicate with one or more access control devices 102 using one or more wireless protocols, including, but not limited to, WI-FI, Bluetooth, including Bluetooth low energy (BLE). According to certain embodiments, the host 120 may be configured to select the manner in which, as well as when, one or more approaches at seeking confirmation of intent of a credential device 116, and/or of the associated user, as discussed below, is to be implemented. Further, such approaches to confirming intent, may be stored on the access control device 102, and/or may retained in one or more other locations, including by the server(s) 118.

Figure 2:
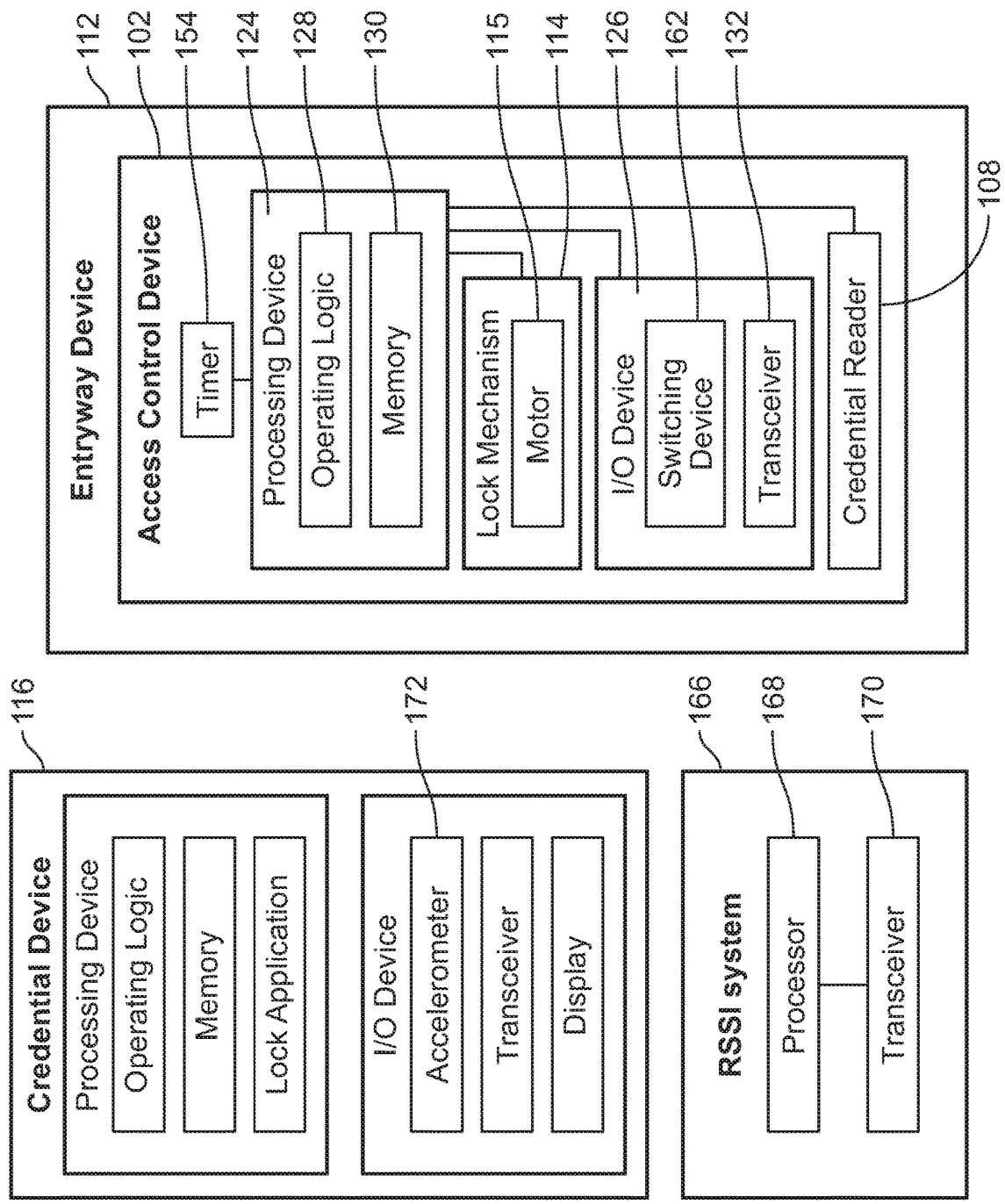
FIG. 2 illustrates a schematic of an exemplary access control device, credential device, and received signal strength indication (RSSI) system.

FIG. 2 illustrates a schematic of an exemplary access control device 102 and credential device 116. As illustrated, the access control device 102 can include a processing device 124, an input/output device 126, operating logic 128, and a memory 130 that may or may not be part of the processing device 124. According to certain embodiments, the input/output device 126 allows the access control device 102, including the reader device 108, to communicate with one or more external devices, including, for example, the credential device 116, among other types of devices that allow data to be inputted and/or outputted to/from the access control device 102. According to other embodiments, the input/output device 126 can be adapted to communicate with the reader device 108, among other devices. According to certain embodiments, in addition to the credential device 116, the external device may include a server 118 or host 120, and/or other access control devices 102 of the access control system 100. Additionally, according to certain embodiments, the external device may be integrated into the access control device 102. It is further contemplated that there may be more than one external device in communication with the access control device 102.

According to certain embodiments, the input/output device 126 includes one or more transceivers 132, network adapters, network cards, interfaces, and/or ports, such as, for example, a USB port, serial port, parallel port, an analog port, a digital port, VGA, DVI, HDMI, FireWire, or any other type of port or interface. Further, the input/output device 126 may include hardware, software, and/or firmware. Additionally, it is contemplated that the input/output device 126 can include more than one of these adapters, cards, or ports. Additionally, according to certain embodiments, the input/output device 126 can also be structured to communicate with a server 118, such as, for example, a cloud server, via an Internet Protocol (IP) connection over the Internet.

The processing device 124 of the access control device 102 can be a programmable type, a dedicated, hardwired state machine, or any combination of these. The processing device 124 may further include multiple processors, Arithmetic-Logic Units (ALUs), Central Processing Units (CPUs), Digital Signal Processors (DSPs), or the like. Processing devices 124 with multiple processing units may utilize distributed, pipelined, and/or parallel processing. The processing device 124 may be dedicated to performance of just the operations described herein or may be utilized in one or more additional applications. In the depicted form, processing device 124 is of a programmable variety that executes algorithms and processes data in accordance with operating logic 128 as defined by programming instructions (such as software or firmware) stored in memory 130. Alternatively, or additionally, the operating logic 128 for the processing device 124 is at least partially defined by hardwired logic or other hardware. The processing device 124 may include one or more components of any type suitable to process the signals received from input/output device 126 or elsewhere, and to provide desired output signals. Such components may include digital circuitry, analog circuitry, or a combination of both.

The memory 130 may be of one or more types, such as a solid-state variety, electromagnetic variety, optical variety, or a combination of these forms. Further, the memory 130 can be volatile, nonvolatile, or a combination of these types, and some or all of the memory 130 can be of a portable variety, such as a disk, tape, memory stick, cartridge, or the like. In addition, the memory 130 can store data that is manipulated by the operating logic 128 of the processing device 124, such as data representative of signals received from and/or sent to the input/output device 126 in addition to or in lieu of storing programming instructions defining the operating logic 128, just to name one example. As shown in FIG. 2, the memory 130 may be included with the processing device 124 and/or coupled to the processing device 124.

Figure 3:
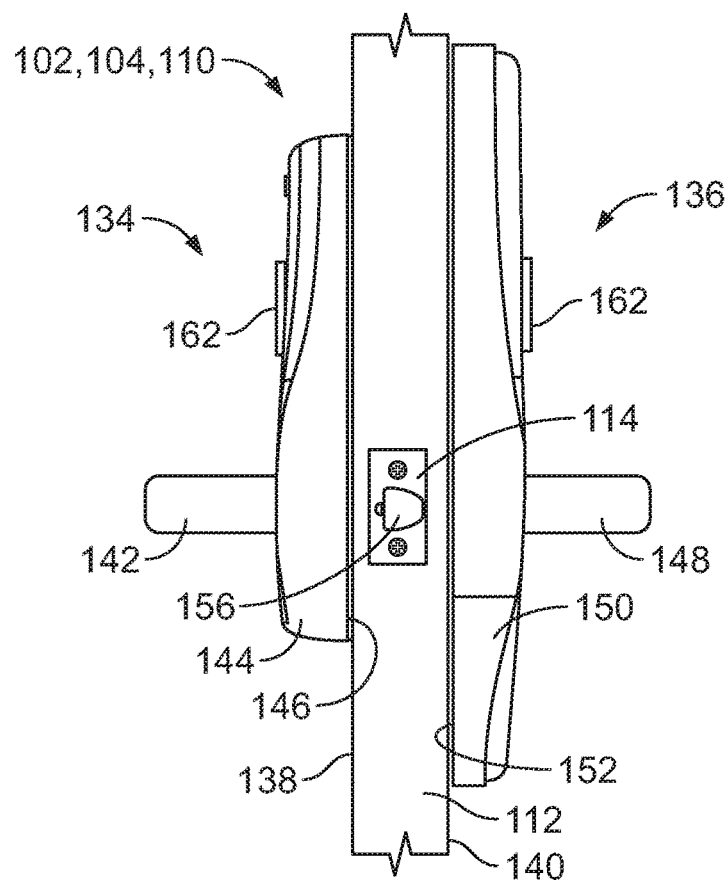
FIG. 3 illustrates a side perspective view of an exemplary access control device mounted against opposing sides of an entryway device and which has a pair of exemplary access switching devices.
Figure 4:
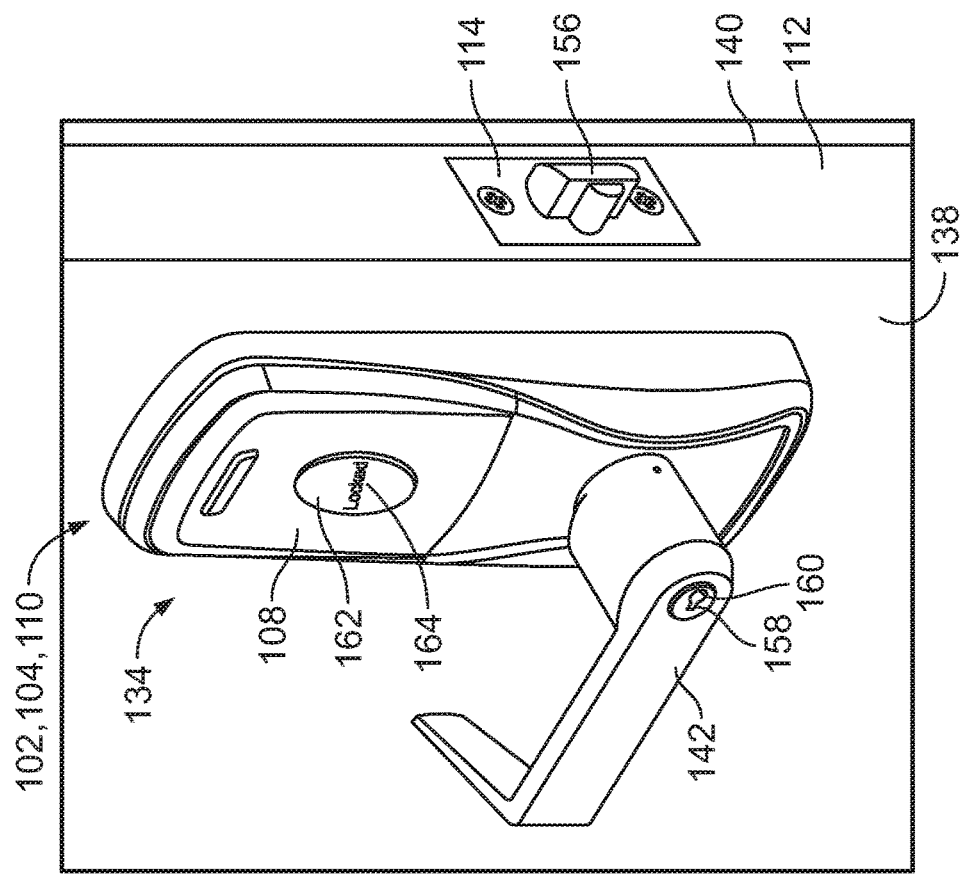
FIG. 4 illustrates a side perspective view of the exemplary first assembly of the access control device shown in FIG. 3, and includes an exemplary access switching device according to an embodiment of the present application.

FIGS. 3 and 4 illustrate an embodiment of an exemplary access control device 102 that can be utilized to at least assist in controlling access, such as, for example, ingress and/or egress, through a controlled opening. In the illustrated embodiment, the access control device 102 includes at least an electronic lockset device 104 that can be utilized to at least lock the entryway device 112 in at least a closed position. Further, as previously discussed, according to certain embodiments, the access control device 102 can also include the reader device 108. According to the illustrated example, the electronic lockset device 104 may include first and second assemblies 134, 136 that are mounted on opposing sides of the entryway device 112. For example, the first assembly 134 may be mounted, or otherwise positioned adjacent to, a first, exterior side 138 of the entryway device 112, while the second assembly 136 may be mounted to a second, interior side 140 of the entryway device 112.

According to the illustrated embodiment, the first assembly 134 can include a first lever 142, a first escutcheon plate 144, and a first backing plate 146. Similarly, the second assembly 136 can include a second lever 148, a second escutcheon plate 150, and a second backing plate 152. According to the depicted certain embodiment, one or both of the first and second assemblies 134, 136 can include or be electrically coupled to the reader device 108 (FIG. 2) that is structured to read and/or to communicate with at least one type of credential device 116. According to certain embodiments, the reader device 108, among other components of the access control device 102, can be configured for one or two-way wireless communication with the credential device 116, among other possible communications with other components of the access control system 100. Further, according to certain embodiments, the reader device 108, as well as other electrical components of the access control device 102, can be housed in an inner region between the first escutcheon plate 144 and a portion of the first backing plate 146, and/or an inner region between the second escutcheon plate 150 and a portion of the second backing plate 152. For example, according to certain embodiments, the reader device 108 and/or other component of the input/output device 126 can be positioned in an inner region within the first assembly 134, while other electrical components of the access control device, including, for example, the processing device 124, a timer 154, and/or an electrical power source, such as, for example, one or more batteries, can be housed in an inner region of the second assembly 136.

According to the illustrated embodiment, the electronic lockset device 104 includes a lock mechanism 114, such as, for example, a lock mechanism 114 having a selectively displaceable deadbolt or latch bolt 156 that can engage or extend into an adjacent wall, frame, or component in a manner that may secure the entryway device 112 in a closed and/or open position relative to the associated controlled opening. The lock mechanism 114 can also be operably coupled to the first lever 142 and/or the second lever 148. Accordingly, at least in certain situations, the rotation of the first and/or second levers 142, 148, can displace the deadbolt or latch bolt 156 from an extended position to an at least partially retracted position such that the deadbolt or latch bolt 156 does not prevent the entryway device 112 from being displaced, relative to the controlled opening, from the closed position to an open position, and/or vice versa. Additionally, according to certain embodiments, the lock mechanism 114 may also include a lock cylinder 158 having a key slot 160 that is accessible from at least one of the first and second sides 138, 140 of the entryway device 112. The lock cylinder 158 may have a variety of different configurations, including, but not limited to, a pin and tumbler, mortise, and tubular lock configuration, among others.

As shown in FIGS. 3 and 4, one, or both, of the first or second assemblies 134, 136 also include a switching device 162 that can be used in connection with controlling an automatic change in a status of the access control device 102, such as, for example, control the automatic unlocking of the access control device 102 such that the entryway device 112 may be displaced to an open position. Moreover, as discussed below, the switching device 162 can be used to at least assist with controlling when, and for how long, the access control device 102 may, or may not, remain in a change status, such as, for example, when and how long a previously locked access control device 102 can be unlocked. Moreover, according to certain embodiments, engagement of the switching device 162 can, in at least certain situations, provide an acknowledgement of an intent to displace the entryway device 112 to the open position and/or to attain access to the corresponding controlled opening. Further, according to certain embodiments, activation of the switching device 162 can, in at least certain embodiments, prompt a request for confirmation of intent to displace the entryway device 112 to the open position and/or to pass through the corresponding controlled opening.

According to certain embodiments, the switching device 162 may be a button, switch, touch screen, or other device that may be engaged or interfaced with/by a user. For example, according to certain embodiments, the switching device 162 can be a mechanical device that is displaceable by engagement with a digit or other portion of the user, such as, for example being slid, depressed, pulled, or otherwise displaced from an un-activated position and an activated position. Further, according to certain embodiments in which the switching device 162 is a mechanical device, the switching device 162 may be biased to the un-activated position, such as, for example, by a spring. Alternatively, according to other embodiments, the switching device can be an optical or electrical device, such as, for example, a resistive or capacitive touch screen or surface, and/or utilize capacitive sensing or proximity technology, among other switches or devices. For example as discussed below, according to certain embodiments, the switching device 162 can be an area, or areas, of the access control device 102 that can be touched, including, for example, touched in a certain, pre-set pattern, so as to confirm an intent to gain access to the corresponding controlled opening. According to certain embodiments, activation of the switching device 162 can result in an electric signal being provided, or not being provided, to the processing device 124 that indicates that a user has engaged the activated, or otherwise operably engaged, the switching device 162.

While FIG. 3 illustrates both the first and second assemblies 134, 136 as having a switching device 162, according to certain embodiments, the switching device 162 can be positioned on only one of the first and second assemblies 134, 136. In such situations, which of the first and second assemblies 134, 136 may have the switching device 162 can depend on a variety of factors, including, for example, whether the access control device 102 is being utilized to control ingress or egress from an area. Moreover, for example, according to certain embodiments, the first, exterior assembly 134 of the electronic lock 110 may be accessible from an exterior region or space, and the second, interior assembly 136 may be accessible from an interior region or space. Thus, according to a least certain embodiments in which the access control device 102 is controlling the passage from the exterior region to the interior region, the switching device 162 may be positioned about at least the first, exterior assembly 134. Further, according to such embodiments, the second, interior assembly 136 may, or may not, have a switching device 162. Conversely, according to a least certain embodiments in which the access control device 102 is controlling passage from the interior region to the exterior region, the switching device 162 may be positioned about at least the second, interior assembly 136. Further, according to such embodiments, the first, exterior assembly 134 may, or may not, have a switching device 162.

Figure 5:
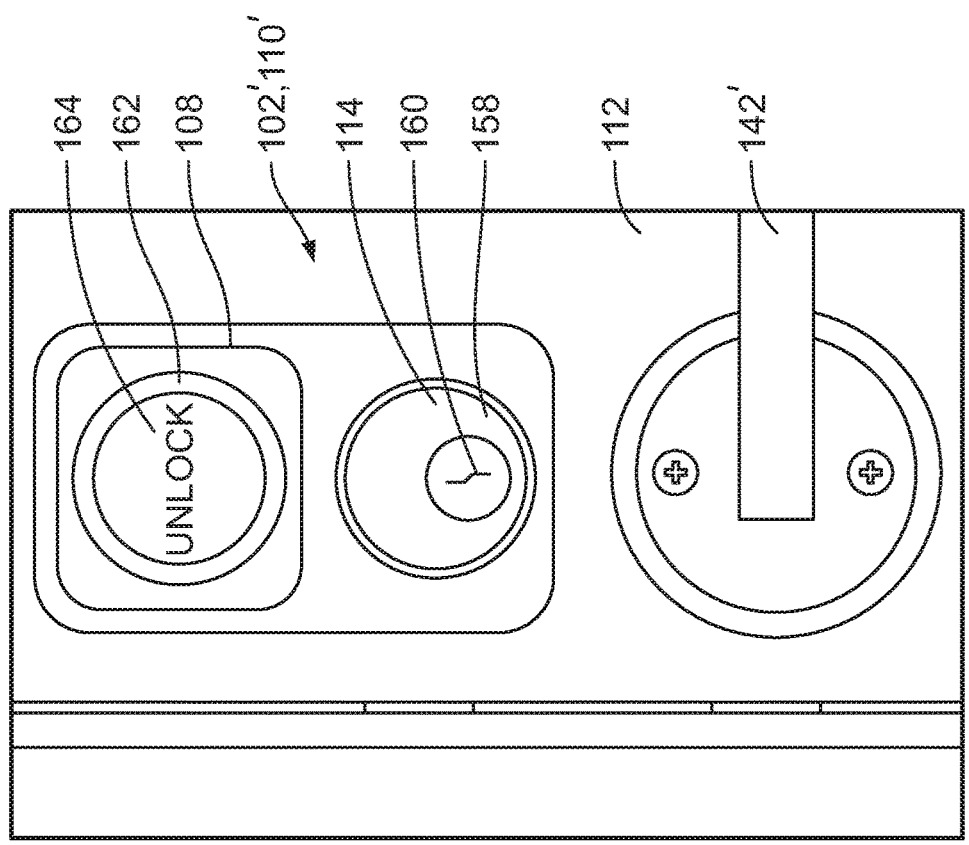
FIG. 5 illustrates a front view of a portion of an alternative first assembly of an exemplary access control device having an access switching device according to an embodiment of the present application.

FIG. 5 illustrates a front view of a portion of an alternative exemplary first assembly 134' having an access switching device 162 according to an embodiment of the present application. According to the depicted embodiment, automatic operation of the access control device 102' can be independent of the rotational displacement of the lever 142' and/or displacement of latch bolt 156', if any, associated with the lever 142'. More specifically, the access control device 102' can include an electronic lock that includes a lock cylinder 158', such as, for example, a pin and tumbler, mortise, and tubular lock configuration, among others that is not coupled to the lever 142' and which is used to control the operation of a deadbolt that may extend into, and retracted from, an adjacent frame or wall. According to certain embodiments, automatic displacement of the deadbolt can be attained in a variety of manners, including, for example, through the application of an electric signal, including, but not limited to, an electric signal used to control the operation of a motor or solenoid 115, among other devices, of the access control device 102'. Further, according to certain embodiments, the lock cylinder 158' can include a keyway that is configured to receive the insertion of a key that can be used to rotatably displace at least a portion of the lock cylinder 158' so as to facilitate the manual retraction or extension of the deadbolt. As shown above, the alternative embodiment of the access control device 102' can include a switching device 162.

As shown in at least FIG. 5, according to certain embodiments, the switching device 162 can include a face portion 164 that can provide a visual indication of the status of at least the access control device 102', such as, for example, whether the access control device 102' is in a "locked" or "unlocked" status. Such statuses can correspond to the position of the latch bolt 156 and/or the deadbolt, such as, for example, whether the deadbolt is in an extended, locked position, or a retracted unlocked position. The status of the access control device 102' can be displayed in a variety of different manners. For example, according to certain embodiments, the face portion 164 of the switching device 162 may comprise a plurality of faces, or the face portion 164 may extend such that, when the position and/or orientation of the face portion 164 is adjusted, a different face, or different portion of the face portion 164, having an indication of a different status of the access control device 102' is viewable to a user of the access control device 102. Alternatively, the access control device 102 may employ another type of visual indicator to indicate the status of the access control device 102, such as, for example, using a digital or electronic display(s) or light(s) on, or adjacent to, the switching device 162 and/or the access control device 102. Additionally, according to certain embodiments, the access control device 102 can also utilize an audible sound to indicate the status, or a change in status, of the access control device 102'.

FIGS. 6-11 illustrate schematic flow diagrams of exemplary processes, or portions of processes, relating to the operation of at least a portion of an access control system 100 in connection with activation of a access control device 102 so as to gain access to, or through, a controlled opening. The operations illustrated for all of the processes in the present application are understood to be examples only, and operations may be combined or divided, and added or removed, as well as re-ordered in whole or in part, unless explicitly stated to the contrary.

Figure 6:
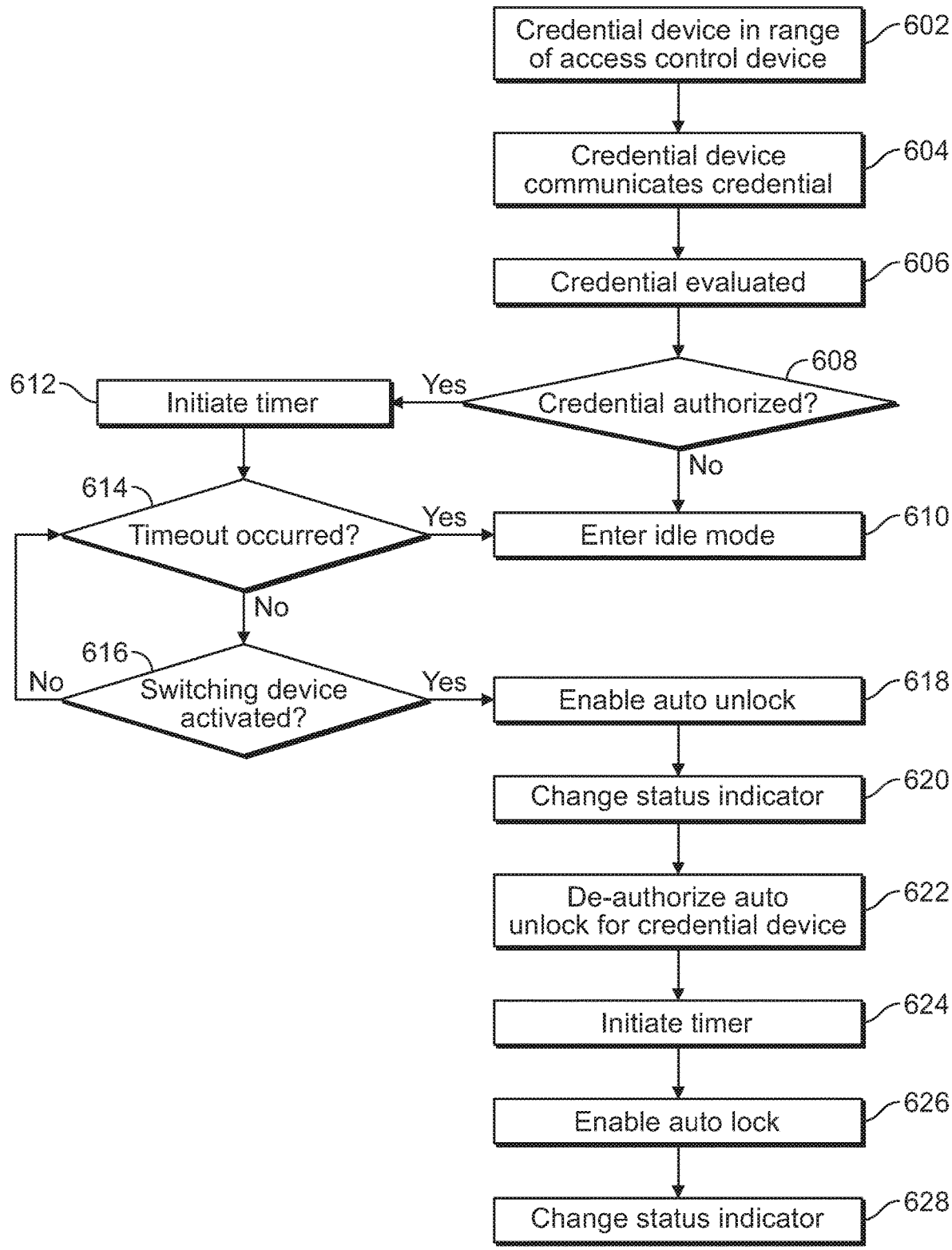
FIG. 6 illustrates a schematic flow diagram of an exemplary process of operation of at least a portion of an access control system in connection with activation of an access switching device so as to confirm intent to gain access to, or through, a controlled opening.

Referencing FIG. 6, according to certain embodiments, at step 602, the credential device 116 is moved into a distance or range so as to be in communication with the access control system 100 and/or the access control device 102. As discussed above, according to certain embodiments, the credential device 116 can be a mobile or portable electronic device that can act either as one or both of an identifier and a credential. Further, the credential device 116 and access control system 100 can be configured such that at least the credential device 116 and other components of the access control system 100 can engage in two-way communication with each other. Further, the location of the credential device 116 when the credential device 116 is within communication range of the access control device 102 can vary, such as, for example, vary for different types of wireless communication protocols and/or different types and positions of components of the access control system 100. For example, according to certain embodiments, the access control system 100 may include one or more antennas that may be configured and positioned to expand the range over which credential device 116 can communicate with the access control system 100 and/or the access control device 102. Additionally, according to certain embodiments, whether the credential device 116 is within range may be based on the distance between the credential device 116 and the access control device 102 or some other component(s) of the access control system 100. According to certain embodiments, the access control device 102 can include a transceiver 132 (FIG. 2) that is configured to communicate with the credential device 116 when the credential device 116 is in relatively close proximity to the access control device 102, such as, for example, within 10 feet or less of the credential device 116, among other larger or smaller distances.

At step 604, with the credential device 116 within range, the credential device 116 can communicate an intent to pass through the controlled opening and/or to operate the access control device 102 or other component of the access control system 100 that may be controlling passage through, or access to, the controlled opening. For example, according to certain embodiments, the credential device 116 may communicate credential information relating to authorization or permission to operate the access control device 102 and/or to open the entryway device 112 from a closed position to an open position. Such communication can include transmission from the credential device 116 of encrypted or non-encrypted identification, authorization, and/or credential information to the access control system 100, including, for example, to the access control device 102.

At step 606, the access control system 100 and/or the access control device 102 may evaluate information communicated from the credential device 116 to determine whether the credential device 116 has authorization to pass through the controlled opening and/or to change the status of the access control device 102 and/or displace the entryway device 112. For example, according to certain embodiments, the access control device 102, host 120, and/or other component of the access control system 100 can determine whether, based on the credential(s) or identification(s) provided by the credential device 116, if the credential device 116 is on an approved user or credential list and/or whether the information provided by the credential device 116 is valid or authentic. Such a determination may also include additional transmissions and/or receipt of encrypted or non-encrypted information to/from the credential device 116. If at step 608 the access control system 100 determines that the credential device 116 is not authorized, or has not provided information to properly indicate the authorization of the credential device 116, then the access control system 100 will not grant authorization to pass through the controlled opening and/or can deny attempts to unlock the access control device 102. According to certain embodiments, in such a situation, the access control device 102 may re-enter an idle mode at step 610.

If, however, the access control system 100 and/or the access control device 102 determines that the credential device 116 has authorization to change the status of the access control device 102 and/or to pass through the controlled opening, then, at step 612, the access control system 100 and/or the access control device 102 can initiate, or otherwise denote the time of, a timer 154. For example, following a determination that the credential device 116 is authorized to at least initiate a change in status of the access control device 102, such as, for example, an automatic unlocking of a locked access control device 102, the timer 154 and the switching device 162 can be used in connection with confirming an intent to change the status of the access control device 102. Moreover, according to certain embodiments, the user may be given a time period in which to activate or otherwise engage the switching device 162 before authorization to change the status of the access control device 102 and/or to pass through the controlled opening is disabled and/or revoked.

Accordingly, following the initiation of the timer 154 at step 616, the access control system 100 and/or the access control device 102 will determine whether the switching device 162 has been activated. If the access control system 100 and/or the access control device 102 determines that the switching device 162 has been activated within a predetermined time period, or before a timeout, as monitored or evaluated through use of the timer 154 at step 614, then at step 618 the status of the access control system 100 and/or the access control device 102 can be changed, such as, for example, the access control device 102 automatically displacing the deadbolt or latch bolt 156 from the extended, locked position, to the retracted, unlocked position. The period of time to activate the switching device 162 can vary, such as, for example, lasting under 5 seconds or under 10 seconds, among other times. Further, according to certain embodiments, the duration of time can be programmed by the owner of the access control system 100, such as, for example, via use of the host 120. Additionally, according to certain embodiments, at step 620, the status indicator of the switching device 162 and/or of the access control device 102 may indicate the change in status of the access control device 102, such as, for example, changing from the term "locked" to "unlocked", change a status light color, and/or transmit an audible signal. A user of the credential device 116 may then be able to manipulate the lockset device 104, such as, for example, rotate the lever 142, 142', such that the user may displace the entryway device 112 from the closed position to the open position.

Following detection of activation of the switching device 162 and/or after a change in status of the access control device 102, the credential or identification of the credential device 116, and/or the credential device 116 itself, that was used in connection with being granted authorization to change the status of the access control device 102 is at least temporarily de-authorized or disabled from having the ability to be used to enable the automatic unlocking feature of the access control device 102. According to certain embodiments, the duration of time during which the credential or identification of the credential device 116, and/or the credential device 116, is disabled or de-authorized from using the automatic unlock feature can be based on a number of factors. For example, according to certain embodiments, at step 622, the credential or identification of the credential device 116, and/or the credential device 116, may be prevented from seeking permission to change a status of the access control device 102 for a predetermined time period, as may be monitored through the use of the timer 154, as indicated by step 624. As discussed below, according to certain embodiments, the subsequent inability to automatically enable a change in the status of the access control device 102 may be based on one or other conditions, such as, for example, the credential device 116 moving outside of, and/or staying within, a certain range or distance from the access control device 102 within a certain time period, and/or the time period that had lapsed since the automatic unlock feature was enabled, among other conditions.

Additionally, according to certain embodiments, before expiration of the predetermined time period or timeout relating to the disabling or de-authorization of the credential or identification of the credential device 116, and/or the credential device 116, can be overridden by a forced interrupt. The forced interrupt can be achieved in a variety of manners. For example, according to certain embodiments, the force interrupt can be driven by a user of the credential device 116. For example, according to certain embodiments, the user of the credential device 116 may enter a passcode or personal identification number (PIN) or press a hot button or icon of/on the credential device 116, among other manners of manually initiating the force interrupt. Such a passcode, PIN, or hot button can be utilized via software or other programming or application ("app") stored on the credential device 116, such as, for example, through the use of software or other applications. Alternatively, the ability to use such a passcode, PIN, or hot button may be communicated or retrieved to/by the credential device 116.

According to other embodiments, the force interrupt can be initiated or requested by the access control system 100. For example, according to certain embodiments, the user of the credential device 116 may subsequently again activate the switching device 162. If the initial predetermined time period for activating the switching device 162 that had already been activated has not expired before the switching device 162 was again activated, the access control device 102 may seek confirmation from the user of the credential device 116 that the user is again trying to re-gain access to the controlled opening via use of the access control device 102. For example, the access control system 100 and/or the access control device 102 can communicate a message or question to the credential device 116 seeking confirmation that the user again seeks access to the controlled opening. According to such an embodiment, the access control system 100 can seek to prevent passage through the controlled opening until the access control system 100 receives a reply communication from the credential device 116 indicating a confirmation of intent to regain access to the controlled opening. Thus, in the event the user communicates, through use of the credential device 116, that the user does not intend to regain access to the controlled opening, or ignores the request from the access control system 100 and/or the access control device 102, the access control system 100 and/or the access control device 102 may seek to prevent access through the controlled opening and/or not change the status of the access control device 102, such as, for example, not unlock a locked access control device 102. Additionally, according to certain embodiments, such a request for confirmation to the user of the credential device 116 may also not be communicated unless, in addition to the subsequent activation of the switching device 162, the credential device 116 also communicated a request or intent to pass through the controlled opening.

Again, referencing FIG. 6, upon timeout, at step 626, the credential device 116 may be re-authorized to enable the automatic unlock feature of the access control device 102. Further, as discussed below, according to certain embodiments, the timer 154 may also be used to enable a subsequent automatic re-lock feature, which can occur at a predetermined time after the access control device 102 had been automatically unlocked at step 618. Such an automatic re-lock feature can include the return of the deadbolt or latch bolt 156 to the extended, locked position. Further, at step 628, in connection with the automatic re-lock, the status indicator may again change, at step 626, to indicate a change in status of the access control device 102, which, in this example, can be associated with the access control device 102 returning to the locked status.

While the above example discusses an intent confirmation event used to at least assist in establishing intent to pass through the controlled opening, namely activation of the switching device 162, occurring after credential information or other authorization information to enable the automatic unlock feature has been communicated from the credential device 116 to the access control device 102, as discussed below according to other embodiments such credential information may not be communicated from the credential device 116 until after completion of an intent confirmation event.

Figure 7:
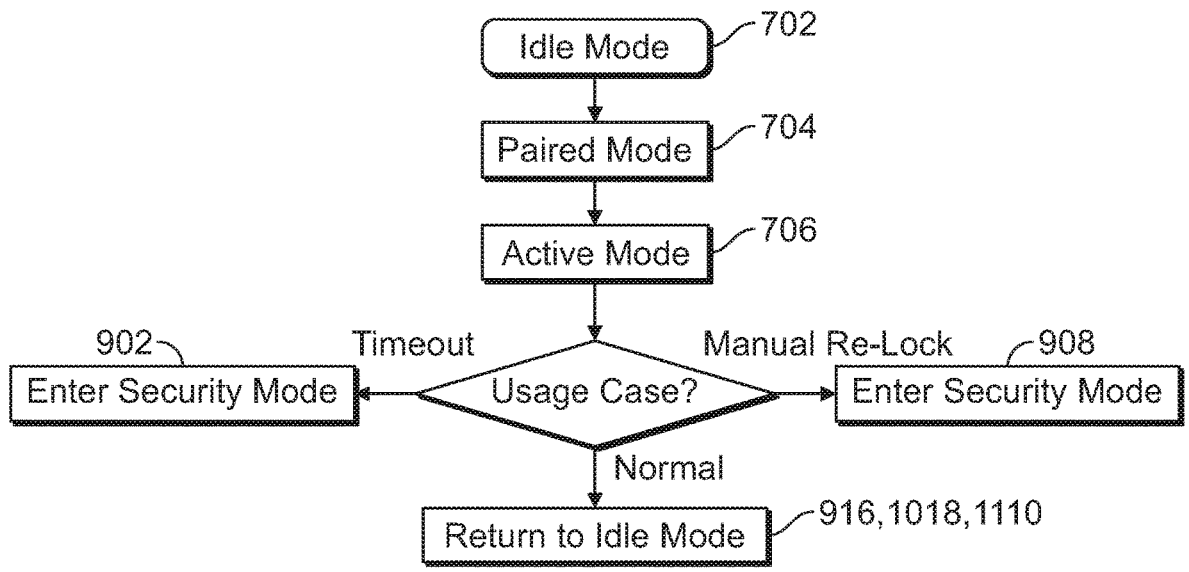
FIG. 7 illustrates a schematic flow diagram of an exemplary process of operation of at least a portion of an access control system in connection with activation of an access control device so as to gain access to, or through, a controlled opening.
Figure 8:
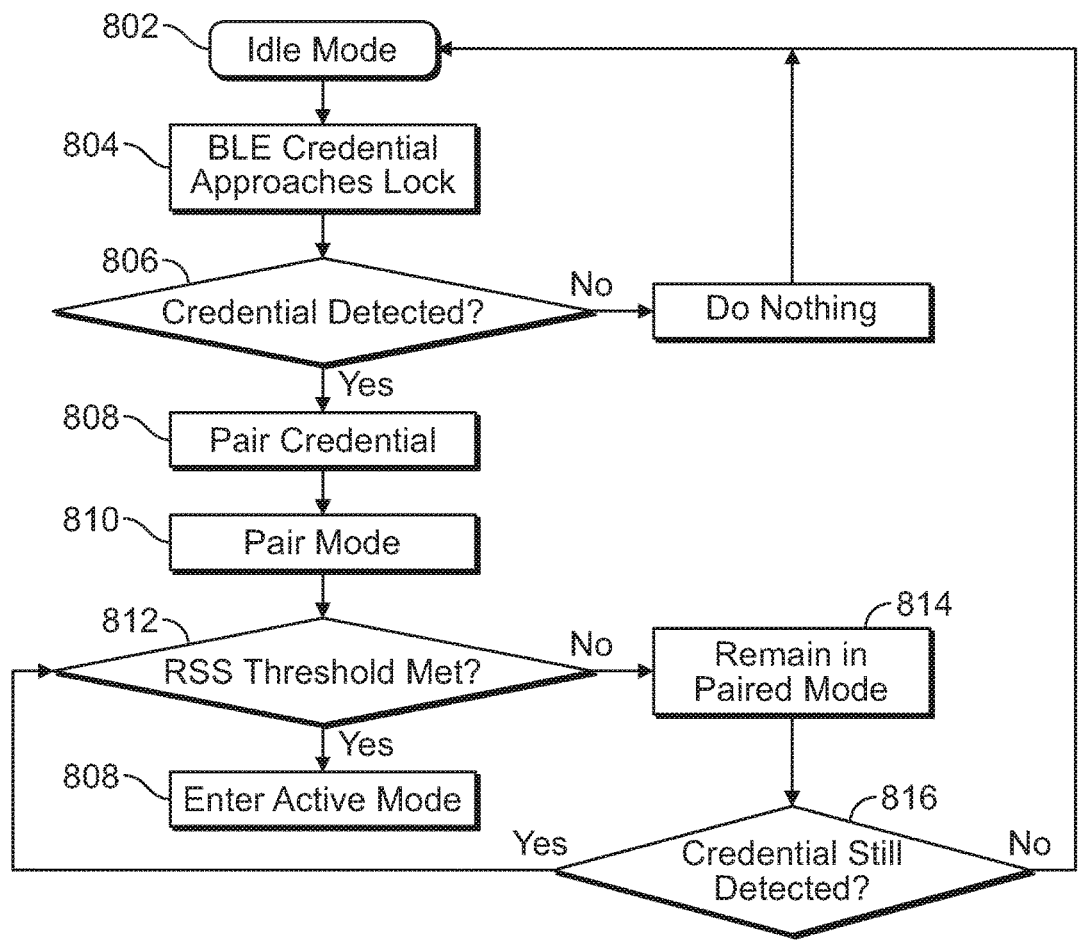
FIG. 8 illustrates a schematic flow diagram of an exemplary process of operation of at least a portion of an access control system that is transitioning from an idle mode to an active mode of operation.

FIG. 7 illustrates an alternative process for operation of an access control device 102. According to the illustrated embodiment, in connection with a period of relative inactivity, at step 702 the access control device 102 can be in an idle mode, such as, for example, a standby or energy saving mode. When an authorized credential device 116 is within range of the access control device 102, at step 704 the credential device 116 can be paired to the access control device 102, or other components of the access control system 100, in a variety of manners. For example, referencing FIG. 8, the access control device 102 can be removed and/or awaken from the idle mode as the credential device 116 approaches access control device 102 at step 802. As the credential device 116 at least approaches the access control device 102 at step 804, the credential device 116 may transmit communication signals using one or more wireless communication protocols, such as, for example, communicate via Bluetooth low energy protocol. Such signals may, when the credential device 116 is within range of the access control device 102, be of sufficient strength to be detected by, and accommodate pairing with, the access control device 102. Further, according to certain embodiments, such signals from the credential device 116 can be in response to advertising signals that can be transmitted from the access control device 102.

At step 806, the access control device 102 and/or other components of the access control system 100 can inquire as to whether, and/or confirm that, signals have been detected or received from the credential device 116. If no signals have been detected or received, the access control system 100 and/or the access control device 102 may remain in, or return to, the idle mode. However, if at step 806 the access control system 100 and/or the access control device 102 have detected signals from the credential device 116, and moreover in this example, have detected a credential(s) or other identification information from the credential device 116, then at step 808 a pair credential may be used to establish authorization of the credential device 116 and access control system 100 and/or access control device 102 to communicate. Further, according to the illustrated embodiment, if authorized, the credential device 116 and the access control system 100 and/or the access control device 102 can then enter a pair mode at step 810 wherein the credential device 116 and the access control system 100 and/or the access control device 102 can engage in certain authorized communications.

At step 812, the access control system 100 and/or the access control device 102 may evaluate the received signal strength indication (RSS or RSSI) from the credential device 116. For example, according to certain embodiments, the access credential device 116 can include an internal RSSI system 166 that can measure the power presented in a received wireless communication(s) or signal(s) from the credential device 116. Alternatively, according to certain embodiments, the RSSI system 166 can be an external system that is in communication with one or more components of the access control system 100 and/or the access control device 102. According to the illustrated embodiment, the RSSI system 166 is shown as including a processor 168 and a transceiver 170. However, according to certain embodiments in which the RSSI system 166 is an internal component or system of a device of the access control system 100, such as, for example, an internal component or system of the access control device 102, the RSSI system 166 can use the processing device 124 and/or the transceiver 132 of the access control device 102.

If the RSS level does not satisfy a threshold level, then, at step 814, the credential device 116 and the access control device 102 can remain in the paired mode. At step 816 the access control system 100 and/or the access control device 102 can then determine whether a signal(s) from the credential device 116 is still being detected. If the signal(s) is/are not still being detected, the access control system 100 and/or access control device 102 can return to the idle mode. If, however, a signal(s) from the credential device 116 is/are still being detected, then the access control system 100 and/or access control device 102 may continue to evaluate whether the signal(s) being received meets the RSS threshold level. If the signal(s) from the credential device does meet the RSS threshold level, then at step 818 the access control system 100 and/or access control device 102 can enter an active mode, which is also identified as step 706 in FIG. 7.

Figure 9:
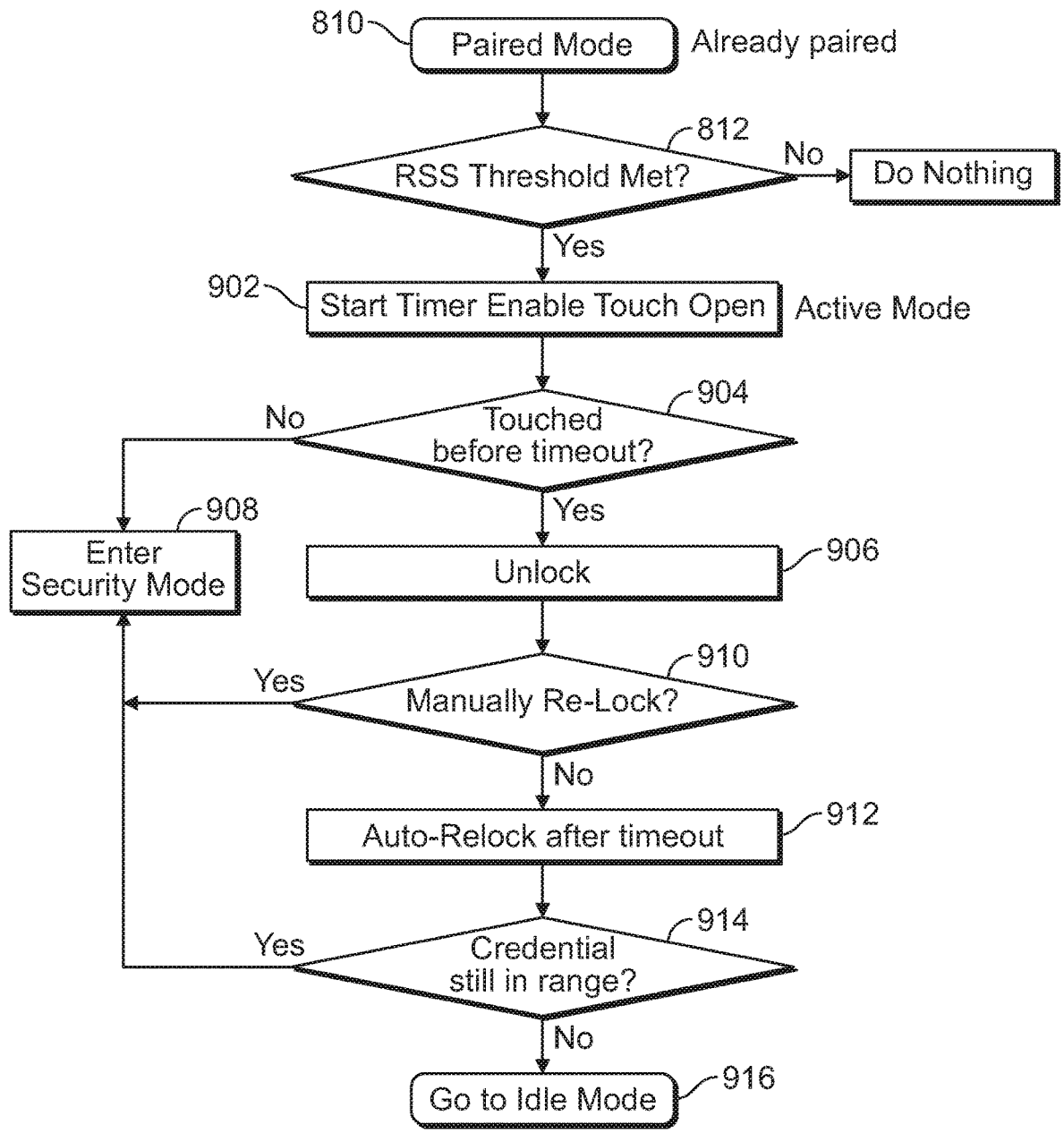
FIG. 9 illustrates a schematic flow diagram of a portion of an exemplary process of operation of at least a portion of an access control system having a credential device and an access control system and/or access control device that are paired and operating between a generally normal operation mode and a security mode.

Referencing FIG. 9, when in the paired mode, and upon satisfaction of the RSS threshold, the access control system 100 and/or access control device 102 can, at step 706, 818 be in the active mode. According to certain embodiments, when in the active mode, at step 902, the timer 154 can be initiated. Further, according to certain embodiments, at step 902 the access control device 102 can also be in a touch open mode in which the status of the access control device 102 can be changed by activation of the switching device 162. For example, according to certain embodiments, the access control device 102 can be prepared to have a change status, such as, for example, being changed from being in a locked status wherein the latch bolt 156 or deadbolt is in an extended, locked position, to an unlocked status, wherein the latch bolt 156 or deadbolt is in a retracted, unlocked position so that a closed entryway device 112 can be displaced from the closed position to the open position. At step 904, the access control system 100 and/or the access control device 102 can determine if the switching device 162 has been activated before the predetermined time has expired, which can be evaluated using at least the timer 154. If the switching device 162 has been activated before occurrence of the timeout, then, at step 906, the status of the access control device 102 can be automatically change, such as, for example, the access control device 102 changing for being locked to being unlocked. However, if the timeout occurs before activation of the switching device 162, then, at step 908, the access control system 100 and/or the access control device 102 can enter into a security mode, as discussed below.

Following the change in status of the access control device 102, the access control system 100 and/or the access control device 102 can determine if the status of the access control device 102 was subsequently changed. For example, according to certain embodiments, following a change in status at step 910, such as, for example, the access control device 102 being unlocked, the access control system 100 and/or the access control device 102 can determine at step 910 whether the status of the access control device 102 was subsequently changed. Such a subsequent change can include, for example, the access control device 102 being returned to the locked status, such as, for example, by manual re-locking of the access control device 102. Such manual re-locking can include, for example, the insertion of a key into the key slot 160 and subsequent rotation of the key and lock cylinder 158, or via manually entering information or engaging an icon that is shown or otherwise available via the input/output device 126 of the access control device 102, such as, for example, via a keypad. If the status of the access control device 102 was manually changed, then the access control system 100 and/or the access control device 102 can enter into the security mode at step 908. If, however, the status of the access control device 102 was not manually changed, then at step 912, the status of the access control device 102 can be automatically changed. For example, at step 912 the access control device 102 can receive an instruction from another component of the access control system 100 or can be programmed to automatically change to a lock status, such as, for example, via operation of a motor or solenoid 115 of the access control device 102 that displaces the latch bolt 156 or deadbolt to the extended, locked position.

Following the change of status of the access control device 102 at step 912, such as, for example, following the automatic re-locking of the credential device 116, the access control system 100 and/or the access control device 102 can, at step 914, determine whether the credential device 116 is still within range of the access control system 100 and/or the access control device 102. For example, according to certain embodiments, the access control system 100 and/or the access control device 102 can determine whether the access control system 100 and/or the access control device 102 is still receiving signals or other communications from the credential device 116. If the credential device 116 is determined to no longer be in range, the access control system 100 and/or the access control device 102 can return to the idle mode at step 916. If, however, the credential device 116 is determined to be in range, the access control system 100 and/or the access control device 102 can enter the security mode at step 908.

Figure 10:
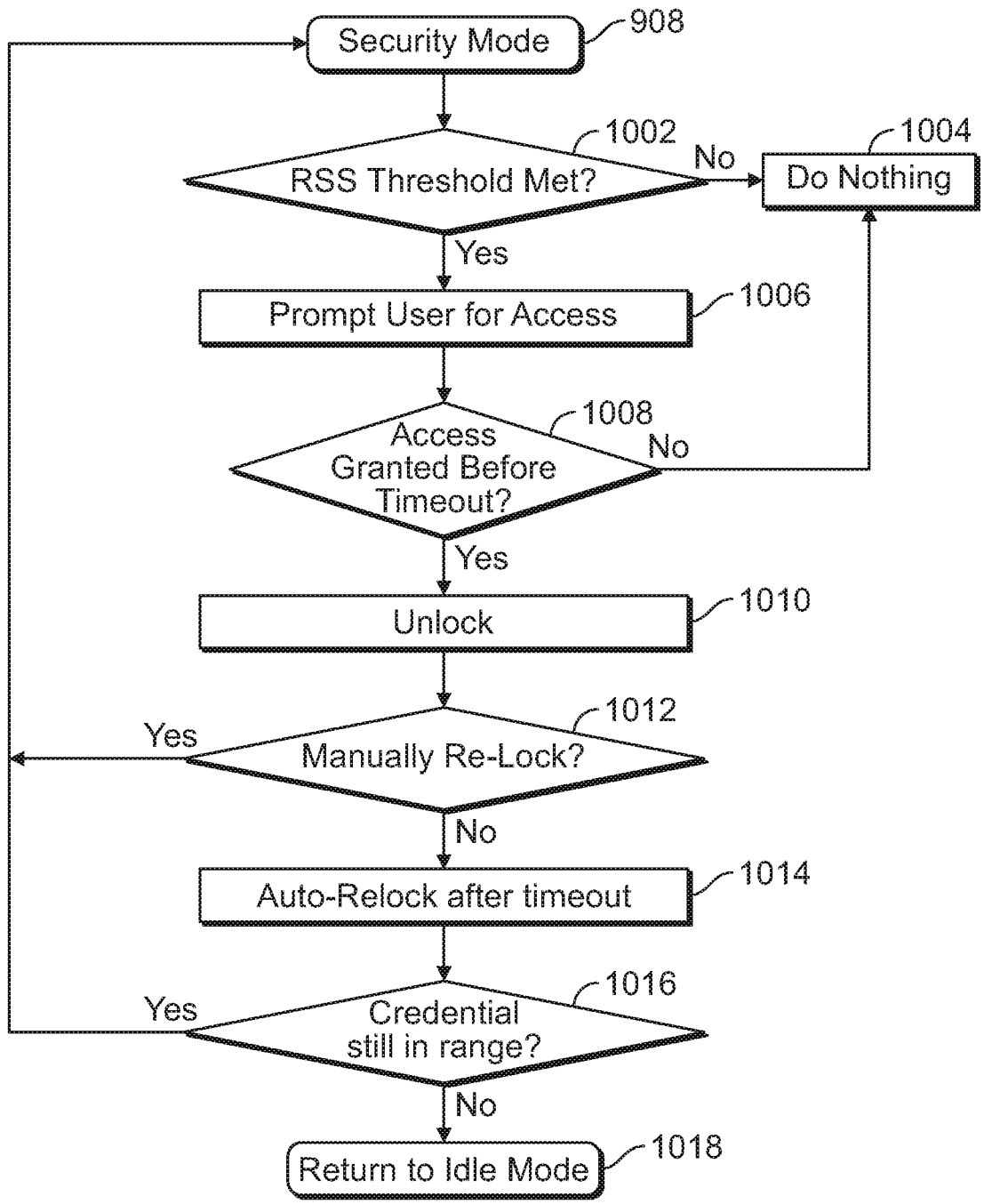
FIG. 10 illustrates a schematic flow diagram of an exemplary process of operation of at least a portion of an access control system during a security mode.

FIG. 10 illustrates an exemplary process following the entry into the security mode at step 908. As shown, according to certain embodiments, the access control system 100 and/or the access control device 102 can again, at step 1002, determine whether the signal(s), if any, being received from the credential device 116 satisfies an RSS threshold level. If the RSS threshold level is not met, then at step 1004, the access control system 100 and/or the access control device 102 may not do anything further in response to signals that are, if any, being received from the credential device 116. If, however, the RSS threshold level is met, then, at step 1006, the access control system 100 and/or the access control device 102 can prompt the user for confirmation of intent to re-enter the controlled passageway and/or to again change the status of the access control device 102. As discussed above, according to certain embodiments, such confirmation can include prompting the user to reply, via the credential device 116, to a confirmation notification or request that the access control system 100 and/or the access control device 102 sent to the credential device 116. Further, at step 1008, the access control system 100 and/or the access control device 102 can evaluate a set time period during which the user is to confirm intent to again pass through, or gain access to, the controlled opening and/or to again change the status of the access control device 102. Again, according to certain embodiments, such a time period may be evaluated using the timer 154. If the credential device 116 provides a response to the notification or request for confirmation of intent before a timeout occurs, then, at step 1010, the status of the access control device 102 can again automatically change, such as, for example, by the access credential device 102 being changed from a locked status to an unlocked status. At steps 1012, 1014, 1016, and 1018, the access control system 100 and/or access control device 102 may then proceed with checking whether the status of the access control device 102 was subsequently manually changed, such as, for example, manually re-locked, and if not manually changed, automatically change the status of the access control device, such as, for example, automatically locking the access control device before checking if the credential is still in range before re-entering the security or idle modes in manners similar to those discussed above with respect to steps 910, 912, 914, 916.

Figure 11:
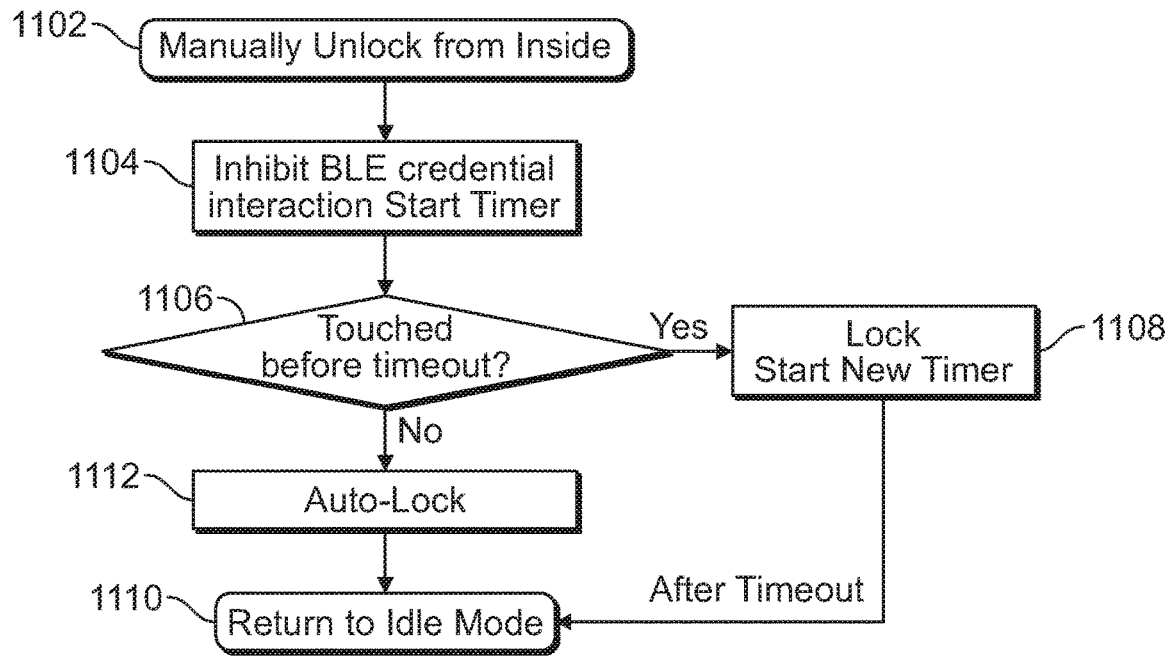
FIG. 11 illustrates a schematic flow diagram of an exemplary process of operation of at least a portion of an access control system following passage through a controlled opening and/or during an egress operation.

FIG. 11 illustrates an exemplary process for operation of an access control device 102 following a manual change in the status of the access control device 102. For example, at step 1102, the lockset device 104 may be unlocked from an interior side of the lockset device 104, such as, for example, by inserting a key into a key slot 160 in the second, interior assembly 136 of the lockset device 104, via operation of a thumb turn on an interior side of the lockset device 104, or via manual operation of the credential device 116, among other manners of manually unlocking the lockset device. According to such an embodiment, following the manual change in the status of the access control device 102 and/or detection of such a change by the access control system 100 and/or the access control device 102, at step 1104, the access control system 100 and/or the access control device 102 can inhibit or otherwise ignore at least certain communications from/with the credential device 116, including, for example, communications relating to credential interaction. Such inhibiting of credential interaction can also be associated with starting the timer 154.

According to such an embodiment, the user may then engage or otherwise activate the switching device 162 in association with an intent to change the status of the access control device 102. Accordingly, at step 1106, the access control system 100 and/or the access control device 102 can determine whether such engagement or activation of the switching device 162 occurred before a timeout occurred, as determined at least in part by using information from the timer 154. If the switching device 162 was activated before the timeout, then in response, the access control system 100 and/or the access control device 102 can change the access control device 102 from the unlocked status to a locked status. Again, according to certain embodiments, when in the locked status, a latch bolt 156 and/or deadbolt of the access control device 102 can be in the extended, locked position. Further, at step 1108, the access control system 100 and/or access control device 102 can start a new timed event. According to certain embodiments, the timed event may set a time that the credential device 116 may be unable to change the status of the access control device 102, and/or be unable to automatically change the status of the access control device 102. Upon a related timeout, at step 1110 the access control system 100 and/or the access control device 102 can return to the idle mode. Conversely, if the switching device 162 is determined at step 1112 to have not been activated, upon a timeout, the access control system 100 and/or the access control device 102 can automatically change the status of the access control device 102. Such automatic change in status of the access control device 102 before the access control system 100 and/or the access control device 102 returns to the idle mode at step 1110.

Another aspect of the present application is the use of strength or speed of the signal provided from the credential device 116 to determine the relative proximity of the credential device 116 to the access control device 102. Such information can at least assist the access control system 100 and/or the access control device 102 in determining whether to change the status of the access control device 102, such as, for example, whether to adjust an access control device 102 from being in one of a locked status or an unlocked status, to the other of the locked status and the unlocked status. More specifically, such an embodiment can determine based, at least in part, on a relative RSS level, whether there is intent to operate the access control device 102 and/or to access the controlled opening.

According to certain embodiments, the RSS level may be evaluated using the RSSI system 166, as discussed above and as shown, for example, in FIG. 2. Further, as previously discussed, the RSSI system 166 can be a component or system of a device of the access control system 100, such as, for example, of the access control device 102, and/or can be a separate, external system. Further, the RSSI system 166 can be configured to evaluate or determine the strength of a wireless communication(s) or signal(s) from at least the credential device 116 for one or more wireless protocols and with respect to one or more access control devices 102. For example, according to certain embodiments, the transceiver 170 of the RSSI system 166 is a Low Energy Bluetooth (BLE) transceiver that is adapted to at least receive BLE signals from the credential device 116, among other wireless communication protocols.

Figure 12:
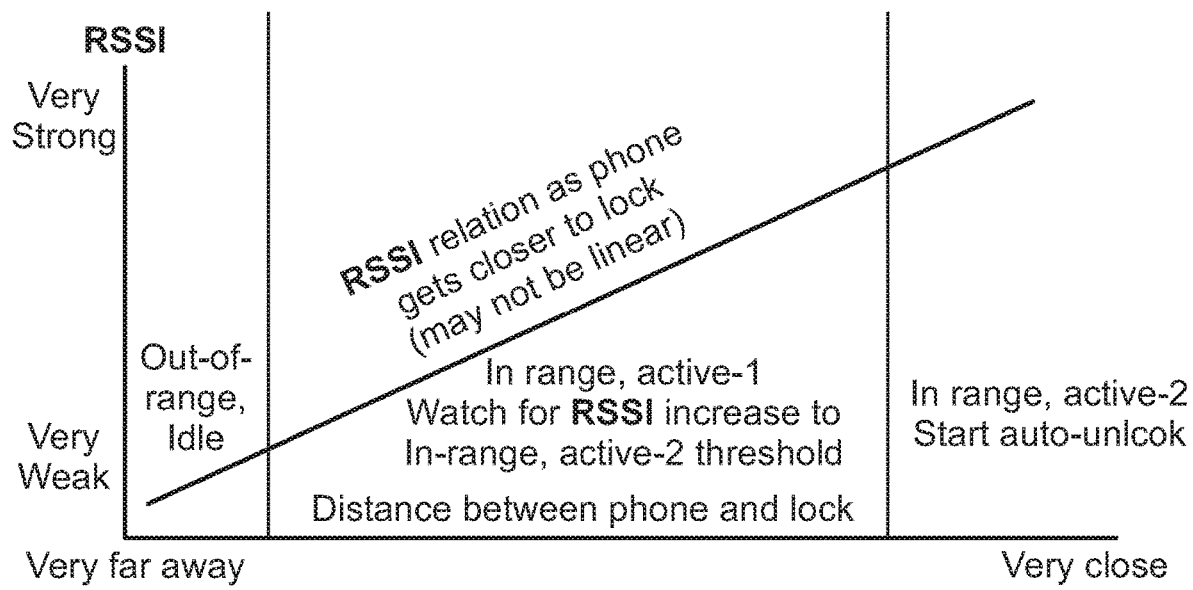
FIG. 12 illustrates an exemplary relationship between RSSI level strength as a function of distance between a credential device and an access control device.

FIG. 12 illustrates an exemplary relationship between RSS level as a function of distance between a credential device 116 and an access control device 102. While FIG. 12 illustrates, for at least purposes of discussion, such a relationship as being linear, the particular nature of the relationship, and moreover whether such a relationship is, or is not, linear or non-linear, can be based on a variety of factors, including, but not limited to, the type of wireless communication protocol and degree of interference, among other factors. As shown in FIG. 12, the vertical axis depicts the strength of the RSS level, and increases from a relatively very weak RSS level to a relatively very strong RSS level. The horizontal axis provides an indication of the distance between the credential device 116 and the access control device 102, and decreases from a location near the vertical axis where the RSS level is relatively very weak and the distance between the credential device 116 and the access control device 102 is relatively large, to the situation in which the credential device 116 and the access control device 102 are moved to be in closer proximity to each other.

Referencing FIG. 12, when the credential device 116 is at a relatively far distance from the access control device 102, or other associated components of the access control system 100, such as, for example, an antenna, the RSS level may be at a relatively low level such that the distance between the credential device 116 and the access control device 102 can be considered at an out-of-range, idle level. During such RSS levels, the access control device 102 can be in the idle mode. Further, to the extent the access control device 102 communicates advertising or other communications providing an indication of the presence of the access control device 102 while the credential device 116 and the access control device 102 are separated by a distance that is at the out-of-range, idle level, the access control device 102 may not receive, or may receive relatively weak, response signals from the credential device 116. Moreover, when at the out-of-range, idle level, communications from the credential device 116 can vary from having a relatively weak RSS level to being non-existent. According to certain embodiments, when at the out-of-range, idle level, the access control device 102 may communicate advertising signals at relatively large intervals, such as, for example, at 4 second intervals. Further, again, such advertising may, or may not, elicit a response from the credential device 116 and/or may result in a reply from the credential device 116 that has a relatively low or weak RSS level.

As indicated in FIG. 12, as the distance between the credential device 116 and the access control device 102 decreases, the RSS level can increase to a point where the RSSI system 166, and/or the firmware embedded therein, can classify the distance between the credential device 116 and the access control device 102 as being at a first active level, which, for at least purposes of discussion, can also be referred to as in-range active-1 level. As the distance between the credential device 116 and access control device 102 continues to decrease, the RSS level can continue to increase from the relatively low RSS level that is associated with being just outside the out-of-range, idle level. According to at least certain systems, the RSS level can increase proportionally to a decrease in the distance between the credential device 116 and the access control device 102.

According to certain embodiments, when the distance between the credential device 116 and access control device 102 is at least in the first active level, the credential device 116 can respond to the advertising of the access control device 102. Such an initial response, and/or subsequent responses from the credential device 116, as well as continued communications from the access control device 102, can include communications that provide credential or identification information that can be used to establish the authority or permission of the credential device 116 to operate the access control device 102, such as for example, unlock an electronic lock 110, and/or gain access to the controlled opening. For example, according to certain embodiments, as the distance between the credential device 116 and the access control device 102 changes to attain the in-range active-1 level, the credential device 116 and the access control device 102 may exchange communications that are used to pair the access control device 102 and the credential device 116. According to certain embodiments, such communications can involve an exchange of a personal identification number (PIN) or personal credential, which may be at least initially manually entered into the credential device 116 and subsequently automatically communicated to the access control device 102. However, as discussed below, according to other embodiments, such exchanges of credential information may not occur until after the successful completion of an intent confirmation event.

Additionally, upon the access control system 100 and/or access control device 102 determining that the distance between the access control device 102 and the credential device 116 is within the in-range active-1 level, the connection interval between the credential device 116 and the access control device 102 can become more frequent than the interval for the previously discussed advertising that occurs when at the out-of-range, idle level. For example, according to certain embodiments, the initial response by the credential device 116 to the advertising of the access control device 102 can be evaluated to determine the associated RSS level of the initial response. Upon determining that the RSS level corresponds to the in-range active-1 level, the access control device 102 can increase the frequency of the advertising from the access control device 102, such as, for example, communicate advertising at one second intervals.

The access control device 102 can then continue to monitor the RSS level of subsequent responses from the credential device 116. Moreover, the access control device 102 can be configured to expect, after receipt of the initial response from the credential device 116, a continuing increase in RSS levels for at least some of the subsequent responses to the advertising of the access control device 102, which can indicate a continuing decrease in the distance between the credential device 116 and the access control device 102. Further, according to certain embodiments, an absence of an increase in the RSS level and/or a subsequent decrease in RSS level can result in the access control device 102 changing the frequency with which the access control device 102 communicates advertising to the credential device 116. Moreover, according to certain embodiments, upon detecting a lack of an increase in the RSS level, the access control device 102 may monitor whether the RSS level does, or does not, increase within a certain time period. According to such embodiments, the absence of an increase in the RSS level before a timeout of that certain time period can result in the access control device 102 reducing the advertising interval, such as, for example, changing the advertising from being transmitted at a one second interval to a two second interval.

Additionally, in response to the lack of an increase in RSS level, the access control device 102 can also set a time period for which the access control device 102 will re-enter the idle mode if a subsequent increase in the RSS level is not detected. For example, according to certain embodiments, if after a time period of around 10 minutes, among other time periods, the RSS level does not increase, the access control device 102 can determine that the credential device 116 is not seeking, or cannot seek, a change in lock status. In response to such a situation, upon timeout of the time period, the access control device 102 can re-enter the idle mode.

If, however, the RSS level continues to increase, the RSS level can reach a threshold RSS level that provides an indication that the credential device is in relatively very close range to the access control device 102. For example, according to certain embodiments, the threshold RSS level can be set to indicate that the credential device 116 and the access control device 102 are separated by a distance of about, and/or less than, ten feet, and, at least according to certain embodiments, indicates that the distance is less than six feet. Further, according to certain embodiments, the threshold RSS level can be set to indicate that the credential device 116 is generally about an arm's length away from the access control device 102.

According to the illustrated embodiment, when the threshold RSS level is met or exceeded, the RSSI system 166, and/or the firmware embedded therein, can classify the distance between the credential device 116 and the access control device 102 as being at a second active level, which, for at least purposes of discussion, can also be referred to as in-range active-2 level. Additionally, according to certain embodiments, once the RSSI system 166 determines that the in-range active-2 level has been attained, and the access control device 102 can be authorized to automatically change the status of the access control device 102. For example, according to certain embodiments, once the in-range active-2 is attained, the embedded firmware of the RSSI system 166 and/or the access control device 102 can enable an automatic unlocking of the access control device 102, such, as, for example, the latch bolt 156 or deadbolt of the access control device 102 being displaced from the extended, locked position to the retracted, unlocked position. Moreover, such an automatic unlock may allow the user of the credential device to displace the entryway device 112 the closed position to the open position so as to enable authorized passage through the controlled opening. Alternatively, according to other embodiments, once the RSSI system 166 determines that the in-range active-2 level has been attained, the credential device 116 may be prompted to communicate credential information that may be used to verify the authenticity and/or authority of the credential device 116. In such a situation, upon verification of the communicated credential information, and in the absence of any other intent confirmation events that may need to be properly completed, the automatic unlocking of the access control device 102 can be enabled.

According to certain embodiments, the automatic unlock of the access control device 102 can be enabled for a certain time period. A variety of different time limits can be used for the time duration of the enablement of the automatic unlocking of the credential device 116, including, for example, a duration of around 10 seconds, among other time limits. Thus, the user of the credential device 116 may have a limited period of time to operate the access control device 102, or other components of the access control system 100, so as to gain passage through the controlled opening.

In the event the predetermined time period following the automatic unlocking of the credential device 116 expires without operation of the access control device 102 or other component of the access control system 100 that allows displacement of the entryway device 112 and/or passage through the controlled opening, the automatic unlock feature of the access control device 102 can be disabled and/or the status of the access control system 100 can change. For example, upon timeout or expiration of the prescribed time period, the embedded firmware of the access control device 102 can automatically change the status of the access control device 102, such as, for example, re-lock the access control device 102. Such automatic re-locking of the access control device 102 can be achieved in a variety of different manners, including, for example, by the access control device 102 activating an electric motor or solenoid 115 of the access control device 102 so that the latch bolt 156 or deadbolt is displaced from the retracted, unlocked position to the extended, locked position.

Further, although certain events can result in the automatic unlock feature of the access control device 102 being disabled and the access control device 102 re-entering the idle mode, the status of the access control device 102 can still be changed, such as, for example, from a locked status to an unlocked status, by manual operation of the access control device 102. Such manual changes can be performed in a variety of manners, including, for example, via operable manipulation of a key in the key slot 160, entering of information into the input/output device 126 of the access control device 102, and/or user operation of the credential device 116, such as, for example, via a hot button and/or entering a PIN or passcode, among other manual operations.

Additionally, according to certain embodiments, upon the access control device re-entering the idle mode, despite the distance between the access control device 102 and the credential device falling in the in-range active-1 level and/or the in-range active-2 level, the credential device 116 can be unable to subsequently be used to enable the automatic unlock of the access control device 102 until certain other intent confirmation events are satisfied. For example, according to certain embodiments, re-enabling the automatic unlock feature may involve, at least in part, the credential device 116 being moved to the out-of-range, idle level or moved to the out-of-range, idle level for a certain period of time, such as, for example, four minutes, among other time limits. In such a situation, as the credential device 116 is returned to the locations that separate the credential device 116 from the access control device 102 by distances that fall within the above-identified in-range active-1 and/or in-range active-2 levels, the credential device 116 and the access control device 102 can again undergo the above-discussed processes for enabling the automatic unlock of the access control device 102.

According to certain embodiments, when the automatic unlocking of the access credential device 116 was used so that the credential device passed through the associated controlled opening, the credential device 116 may still be within the in-range active-1 and/or in-range active-2 level relative to the access control device 102, albeit on an opposite side of the controlled opening. According to certain embodiments, in such situations, the access control system 100 and/or the access control device 102 may monitor whether the credential device 116 stays within the in-range active-1 and/or in-range active-2 level relative to the access control device 102 for a period of time. For example, the access control device 102 may evaluate for a period of time, such as, for example, ten minutes, whether the RSS level indicates that the credential device 116 has, or has not, remained within the in-range active-1 level and/or in-range active-2 level relative to the access control device 102. If the RSS levels indicate that during the time period the credential device 116 has not left the in-range active-1 level and/or the in-range active-2 level, then during that time period, the automatic unlock of the access control device 102 can remain enabled. However, according to such an embodiment, upon determination that an RSS level is outside of the RSS level for the in-range active-1 and/or in-range active-2 levels, the automatic unlock feature may be disabled. Further, such disablement of the automatic unlock feature can also be accompanied by the automatic locking of the access control device 102. However, in such situations, the status of the access control device 102 can still be manually changed, such as, for manually locked or unlocked, as previously discussed.

In addition to changing the status of the access control device 102, such as, for example, enabling the automatic unlocking of the access control device 102, the evaluation of RSS levels may also be used in connection with having authorization to change programming of the access control device 102. For example, according to certain embodiments, at least certain credential devices 116 may not be authorized to program the access control device 102 unless the RSS level, as determined by the access control device 102 or other component of the access control system 100, falls within a certain level. For example, according to certain embodiments, a credential device 116 may not be granted authorization to program a credential device 116 unless the credential device 116 is both paired to the access control device 102 as well as be separated from the access control device 102 by a distance that is within the in-range active-1 level and/or in-range active-2 level.

While the above examples are discussed in terms of RSS levels, the distance, if any, between the access control device 102 and the credential device 116 can be determined in a variety of other manners. For example, according to certain embodiments, in addition to, or in lieu of, evaluating RSS levels, the distance between the access control device 102 and the credential device 116 can be determined using a speed of light test. Further, according to other embodiments, the access control system 100 and/or access control device 102 may include directional antennas or signal direction modifiers that can assist in determining the location of the credential device 116 that may be used in connection with attempting to gain access to the controlled opening, and more specifically, can determine whether the credential device 116 is within a certain proximity to the access control device 102 to enable the automatic unlocking of the access control device 102.

Additionally, while the automatic unlocking of the access control device 102 is discussed above in connection with RSS levels and an authorized credential device 116, such automatic unlocking can be associated with other intent confirmation events, in addition to, or in lieu of RSS levels, that can at least confirm an intent to pass through a controlled opening. Further, as previously mentioned, such other intent confirmation events can, according to certain embodiments, be performed after the credential device 116 has communicated credential information to the access control device 102 and/or the access control system 100 that has been used to authenticate the credential device 116. According to other embodiments, the credential device 116 may not communicate credential information, and/or the access control device 102 may not authenticate the credential device 116, until such intent confirmation events have been satisfied.

For example, according to certain embodiments, as the distance separating the credential device 116 and access control device 102 is reduced such that the access control device 102 and the credential device 116 are within the in-range active-1 and/or in-range active-2 levels away from each other, an application ("app") can appear, if not already appearing, on the credential device 116, such as, for example, on a screen of a smartphone. The application, which can be initiated by the credential device 116 and/or the access control device 102, can request or provide a notification that the user of the credential device 116 is to touch or activate one or more icons on the screen or display of the credential device 116, and/or buttons positioned on the credential device 116. According to certain embodiments, the credential device 116 may not communicate credential information from the credential device 116 to the access control device 102 until the user of the credential device 116 complies with the request or notification. Alternatively, the access control device 102 may not enable the automatic unlock feature of the access control device 102 until after the user of the credential device 116 has complied with the request or notification. Such notifications or requests can take a variety of other forms that require the user and/or the credential device 116 to perform different actions or tasks before automatic unlocking of the access control device 102 can be enabled. For example, according to certain embodiments, the request or notification can be a question for the user of the credential device 116 to answer or prompts the input certain identification information, such as, for example, by pressing one or more icons, buttons, and/or switches on the credential device 116 and/or by speaking into a microphone of the credential device 116.

Alternatively, according to other embodiments, the request or notification can seek to obtain biometric verification, such as, for example, have the user of the credential device 116 be positioned for a camera or scanner to take an image in connection with facial recognition, present a digit, such as a finger, for scanning and subsequent verification, and/or have the user say certain words, phrases, or sounds in connection with voice verification. Notification of intent could also be linked to a wearable device, and could be responded to via an interaction with a device other than the credential device 116, such as, for example, via a watch, among other wearable devices.

According to other embodiments, the status of the access control device 102 may not change until after activation of the switching device 162 that is in the form of one or more touch sensitive areas on the access control device 102. Such embodiments may include having the user of the credential device 116 to touching a plurality of touch sensitive areas on the access control device 102, and/or touch such touch sensitive areas in a particular pattern or sequence.

Other intent confirmation events can include certain physical displacement(s) or movement(s) of the credential device 116. For example, according to certain embodiments, as the credential device 116 approaches the access control device 102, the credential device 116 and the access control device 102 can communicate with each other to establish or verify the authorization of the credential device 116 to operate the access control device 102 and/or to pass through the associated controlled opening. The intent to enter through a controlled opening can be further confirmed by generating a particular electrical or visual signal that corresponds to moving the credential device 116 at a particular time and/or in a particular manner, pattern, and/or speed(s). Moreover, a user may shake, wave, or otherwise move the credential device 116 in a particular direction(s), make a certain number of a movements with the credential device, and/or move the credential device at a certain speed(s). According to certain embodiments, such movements may be tracked using an accelerometer 172 and/or other motion-detecting devices that may be used to generate from such movements an electronic signal that can be communicated to the access control device 102. Alternatively, such movements may be tracked by a camera or other image capturing device that may translate such movement into electrical signals.

The access control device 102 may then verify the information of the communicated electronic signal to determine whether the associated communicated movement information satisfies recorded information for that credential device 116. For example, the credential device 116 may be moved in a manner that simulates three knocks on a door. Such movement may be used to generate a corresponding electronic signal, such as, for example, via use of the accelerometer 172 and/or other motion-detecting devices. The credential device 116 may then verify the authenticity of the movement using other information stored on the credential device 116. Such evaluation may be a prerequisite to determining whether to communicate at least certain credential information to the access control device 102 and/or to enable an automatic change in status of the access control device. According to certain embodiments, if the credential device 116 does not, or cannot, verify the authentication of the movement(s), the credential device 116 may not communicate information to the access control device 102 that could otherwise lead to the enablement of the automatic lock feature of the credential device. Alternatively, according to other embodiments, authentication of the electronic signal generated in response to movement of the credential device 116 may be performed by the access control device 102 or the component of the access control system 100, and use information that can be stored at a variety of locations of the access control system 100, including stored by the access control device 102.

According to certain embodiments, rather than, or in addition to, using certain movements of the credential device 116, the intent to operate the access control device 102 and/or pass through the associated controlled opening can be confirmed by evaluating one or more particular movements of the user of the credential device 116. For example, according to certain embodiments, the credential device 116 can include an accelerometer 172 and/or other motion-detecting devices that can be used to determine certain movements of the user, including for example, relatively quick surges and withdrawals toward/away from the access control device 102 and/or patterns of movements. Additionally, according to certain embodiments, such movements or patterns of movement can be evaluated using one or more video cameras, which can capture one or more images that are translated to electronic signals that are compared with reference electronic signals in connection with verifying intent to enter a controlled opening and/or operate an access control device 102.

Conversely, rather than utilizing particular movement or patterns of movement of the credential device 116 and/or the user of the credential device 116, lack of motion for a certain time period may also be utilized to confirm an intent to gain access to a controlled opening and/or to operate the access control device 102. For example, according to certain embodiments, the credential device 116 can be configured to sense a general stoppage in motion for a predetermined time, such as, for example, for a period of one to two seconds, among other time periods, before the credential device 116 will communicate credential information to the access control device 102. Such an embodiment could at least assist in preventing the unintentional unlocking of the access control devices 102 that could otherwise occur when the credential device 116 merely is passing the access control devices 102. According to certain embodiments, upon completion of the time period of general stoppage of motion, the credential device 116 can communicate credential information that can facilitate the automatic unlocking of the access control device 102 and/or the status of the access control device 102 can automatically change. However, like other embodiments of the present application, such features can be combined with one or more prerequisites to at least assist in confirming an intent to enter a controlled opening and/or to operate the access control device 102.

Additionally, the above-identified intent confirmation events may, or may not, be associated with a time limit, which, can, according to certain embodiments, be evaluated using the timer 154. Further, as previously discussed, the failure to satisfactorily complete the intent confirmation event before a timeout of the can result in the denial of an attempt to change the status of the access control device 102 and/or to gain access to the associated controlled opening. Further, according to certain embodiments, the failure to satisfactorily complete the intent confirmation event before a timeout can result in the access control device 102 re-entering the idle mode.

The intent to enter through a controlled passageway when the credential device 116 is within range of one or more access control devices 102 can be also communicated in a number of other manners. For example, according to certain embodiments, triangulation can be employed between multiple access control devices 102. According to certain embodiments, multiple access control devices 102, including, but not limited to two or more and/or various combinations of electronic locks, crash bars, reader devices, and beacons, among other devices, can utilize BLE communications, and thus may each include or be in electrical communication with an associated BLE antenna. According to such an embodiment, the access control devices 102, which may each have an established, generally static location, may use triangulation to determine the location of the credential device 116. Such an approach may allow a particular access control device 102 from the plurality of access control devices 102 to be determined, or be selected, for communicating an advertising or other credential to the credential device 116 if and when that credential device 116 comes into range of that particular access control device 102, which can also be determined via the use of triangulation. Additionally, if the credential device 116 is determined to be authorized to operate the access control device 102 and/or has permission to attain access to the associated controlled opening, triangulation can also be used to determine when the credential device 116 is in close enough proximity to the access credential device 116 such that the access control device 102 can enable the automatic unlock feature. Moreover, according to certain embodiments, intent to enter through the associated controlled opening can be confirmed through the proximity of the credential device 116 to the access control device 102. According to other embodiments, as discussed above, enablement of the automatic unlock feature may be predicated on the satisfaction of at least one other intent confirmation event, such as, for example, activation of the switching device 162, among other intent confirmation events.

Additionally, according to certain embodiments, as each of a plurality of such access control devices 102 can have, or be assigned, a generally static location, triangulation can be utilized by the credential device 116 to determine which of the plurality of access control devices 102 the credential device 116 is approaching. Moreover, such triangulation can be used to determine which, if any, of the plurality of access control devices 102 is to be associated with an intent, if any, to be operated by use of the credential device 116 so as to accommodate access to the associated controlled opening. According to certain embodiments, the credential device 116 can use such information to determine which, if any, of the plurality of access control devices 102 the credential device 116 is to communicate with and/or to which advertising the credential device 116 may provide a reply or response. Thus, such an approach may also limit which of the access control devices 102 the credential device 116 may communicate intent to operate and/or intent to gain access to the associated controlled opening.

While the above example is discussed in terms of using triangulation and BLE signals, the location of the credential device 116, including the location of the credential device 116 relative to one or more of access control devices 102, can be determined in a variety of other manners. For example, according to certain embodiments, such relative positions of the credential device 116 and one or more of the access control devices 102 can be determined using a global positioning system (GPS), WIFI, and/or BLE Radio on the access control devices 102 and/or other BLE-enabled devices.

While the foregoing has discussed a variety of approached of confirming intent to pass through a controlled opening and/or operate the associated access control device 102, a number of the approaches may be used in combination with other approaches to provide further verification of intent. Additionally, according to certain embodiments, the access control system 100 and/or the access control device 102 may be configured to select one or more of these approaches to utilize at certain times, and which other approaches to implement at other times. Thus, the approach for verifying the intent can be relatively dynamic, as the selected approach(es) utilized in connection with verifying an intent in one instance may be different than the approach(es) utilized in verifying another intent in another instance. Additionally, according to certain embodiments, the various available approaches can be organized, either individually and/or in various combinations, in a selectable table that provides an administrator of the access control system 100 and/or of the access control device 102 which approaches are to be, or are not to be, utilized before a credential device 116 communicates credential information and/or before the automatic unlock feature of the access control device 102 is activated. Additionally, such tables may be stored on the host 120 and/or accessible to the host 120 from the server 118.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law.

Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A method, comprising:
   receiving, by an access control device, credential information from a credential device;
   determining, by the access control device, at least one of a distance or a direction of the credential device relative to the access control device based on one or more signals transmitted between the credential device and the access control device;
   evaluating, by the access control device, the credential information to determine whether the credential device has authorization to pass through a controlled opening secured by the access control device, wherein evaluating the credential information comprises evaluating the credential information to determine whether the credential device has authorization to pass through the controlled opening secured by the access control device based on the at least one of the distance or the direction of the credential device relative to the access control device;
   detecting, by the access control device, that a switching device of the access control device has been physically activated; and
   automatically unlocking a lock mechanism of the access control device in response to (i) determining that the credential device has authorization to pass through the controlled opening and (ii) detecting that the switching device has been physically activated.

2. The method of claim 1, further comprising automatically locking the lock mechanism in response to (i) automatically unlocking the lock mechanism and (ii) detecting that the switching device has been further physically activated.

3. The method of claim 1, wherein detecting that the switching device of the access control device has been physically activated comprises capacitive sensing that the switching device has been physically activated.

4. The method of claim 1, wherein determining the at least one of the distance or the direction of the credential device relative to the access control device comprises determining the at least one of the distance or the direction of the credential device relative to the access control device based on at least one of a strength or a speed of the one or more signals transmitted between the credential device and the access control device.

5. A method, comprising:
   receiving, by an access control device, credential information from a credential device;
   evaluating, by the access control device, the credential information to determine whether the credential device has authorization to pass through a controlled opening secured by the access control device;
   detecting, by the access control device, that a switching device of the access control device has been physically activated;
   enabling a first automatic change of a lock mechanism of the access control device in response to (i) determining that the credential device has authorization to pass through the controlled opening and (ii) detecting that the switching device has been physically activated; and
   enabling a second automatic change of the lock mechanism in response to (i) enabling the first automatic change of the lock the mechanism and (ii) detecting that the switching device has been further physically activated;
   wherein enabling the first automatic change of the lock mechanism comprises enabling an automatic unlock of the lock mechanism; and
   wherein enabling the second automatic change of the lock mechanism comprises enabling an automatic lock of the lock mechanism.

6. The method of claim 5, wherein enabling the first automatic change of the lock mechanism comprises enabling the first automatic change of the lock mechanism in response to (i) determining that the credential device has authorization to pass through the controlled opening and (ii) detecting that the switching device has been physically activated within a predetermined time period subsequent to authorization of the credential device.

7. The method of claim 5, wherein enabling the automatic unlock of the lock mechanism comprises automatically unlocking the lock mechanism.

8. The method of claim 5, wherein detecting that the switching device of the access control device has been physically activated comprises capacitive sensing that the switching device has been physically activated.

9. The method of claim 5, further comprising determining, by the access control device, at least one of a distance or a direction of the credential device relative to the access control device based on one or more signals transmitted between the credential device and the access control device; and wherein evaluating the credential information comprises evaluating the credential information to determine whether the credential device has authorization to pass through the controlled opening secured by the access control device based on the at least one of the distance or the direction of the credential device relative to the access control device.

10. The method of claim 9, wherein determining the at least one of the distance or the direction of the credential device relative to the access control device comprises determining the at least one of the distance or the direction of the credential device relative to the access control device based on at least one of a strength or a speed of the one or more signals transmitted between the credential device and the access control device.

11. The method of claim 10, wherein determining the at least one of the distance or the direction of the credential device relative to the access control device comprises determining the at least one of the distance or the direction of the credential device relative to the access control device based on a speed of light.

12. The method of claim 5, wherein evaluating the credential information comprises transmitting the credential information to a host device.

13. An access control system, comprising:
a switching device, wherein the switching device comprises at least one of a capacitive or resistive touch screen including an electronic display or indicator;
a lock mechanism;
a processor; and
a memory comprising a plurality of instructions stored thereon that, in response to execution by the processor, causes the access control system to:
receive credential information from a credential device;
evaluate the credential information to determine whether the credential device has authorization to pass through a controlled opening secured by the lock mechanism;
detect that the switching device has been physically activated, wherein to detect that the switching device has been physically activated comprises to detect interaction of a user with the at least one of the capacitive or resistive touch screen including the electronic display or the indicator; and
automatically unlock the lock mechanism in response to a determination that the credential device has authorization to pass through the controlled opening and the switching device has been physically activated.

14. The access control system of claim 13, wherein the plurality of instructions further causes the access control system to automatically lock the lock mechanism in response to the automatic unlock of the lock mechanism and further activation of the switching device.

15. The access control system of claim 13, further comprising an access control device that includes the switching device, the lock mechanism, the processor, and the memory.

* * * * *